(12) United States Patent
Kawazoe et al.

(10) Patent No.: US 7,426,432 B2
(45) Date of Patent: *Sep. 16, 2008

(54) COOPERATIVE SPEED CONTROL SYSTEM

(75) Inventors: Hiroshi Kawazoe, Falls Church, VA (US); Hiroshi Tsuda, McLean, VA (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 393 days.

This patent is subject to a terminal disclaimer.

(21) Appl. No.: 11/094,347

(22) Filed: Mar. 31, 2005

(65) Prior Publication Data

US 2006/0224294 A1   Oct. 5, 2006

(51) Int. Cl.
*B60K 31/00* (2006.01)
(52) U.S. Cl. .............................. 701/93; 701/96; 180/170
(58) Field of Classification Search .................... 701/93, 701/96, 98; 180/170; 123/349; 340/438, 340/441
See application file for complete search history.

(56) References Cited

U.S. PATENT DOCUMENTS

| | | | | |
|---|---|---|---|---|
| 3,878,915 A | * | 4/1975 | Purland et al. | 180/170 |
| 4,457,392 A | * | 7/1984 | Caldwell et al. | 180/176 |
| 5,161,633 A | * | 11/1992 | Torrielli et al. | 180/170 |
| 5,774,820 A | * | 6/1998 | Linden et al. | 701/93 |
| 6,311,121 B1 | * | 10/2001 | Kuragaki et al. | 701/96 |
| 6,363,310 B1 | * | 3/2002 | Schuplin et al. | 701/93 |

* cited by examiner

*Primary Examiner*—Yonel Beaulieu
(74) *Attorney, Agent, or Firm*—Foley & Lardner LLP

(57) ABSTRACT

A device for automatically controlling vehicle speed, including a processor adapted to receive at least a first signal indicative of a first local required speed, a second signal indicative of a second local required speed received after the first signal, and a third signal indicative of a value of a current set vehicle speed, wherein the processor includes logic to (i) automatically determine a new set vehicle speed based at least on the first local required speed, the second local required speed, and the current set vehicle speed; and (ii) automatically initiate output of a signal to a vehicle speed controller to change the vehicle speed to a new set vehicle speed.

34 Claims, 41 Drawing Sheets

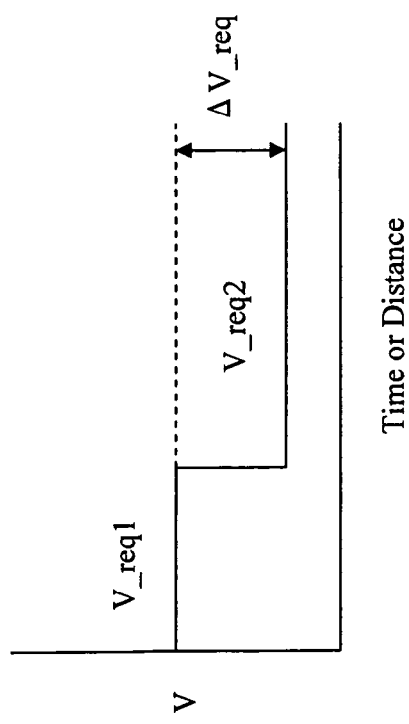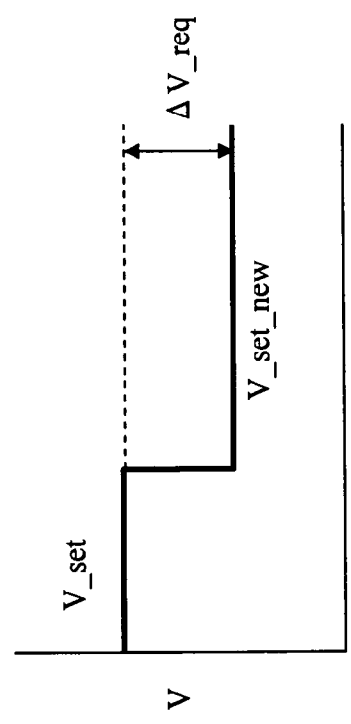

COOPERATIVE SPEED CONTROL SYSTEM

BACKGROUND OF THE INVENTION

Speed control systems such as cruise control systems and adaptive cruise control system (ACC) are common on vehicles. Even car owners who do not have speed control systems in their own vehicles are typically familiar with such devices and often easily implement the use of the speed control systems when using vehicles with such systems. Drivers often find it convenient to set a desired speed for the vehicle and allow the speed control system to maintain the speed of the vehicle at the set speed. However, existing speed control systems still require a relatively substantial amount of input from the driver to alter the speed of the vehicle. For example, when a speed limit changes from one speed to another, for example, from 50 miles per hour to 65 miles per hour, and the speed control system was previously set to maintain a vehicle speed of just below 50 miles per hour, the driver must affirmatively change the set speed of the vehicle control system to increase the vehicle speed. For example, if the vehicle control system was set at just below 50 miles per hour to comply with the posted speed limit of 50 miles per hour the vehicle will continue to drive at 50 miles per hour unless the driver takes some action. By way of a further example, traffic conditions may change such that the driver who is driving below the posted speed limit due to congestion should increase the vehicle speed once the congestion on the roadway has been relieved. If, for example, the driver is driving in a high traffic area where the posted speed limit is 55, but the density of vehicles on the roadway will only permit the driver to drive at 40 miles per hour and the driver sets the speed control system to 40 miles per hour, once the traffic condition changes such that the cars around him may again safely travel at (or under) the posted speed limit of 55 miles per hour, the driver must affirmatively change the speed setting of the speed control system to increase the speed of the vehicle. Thus, there is a need for a speed control system that better interacts with a changing vehicle environment.

SUMMARY OF THE INVENTION

In an embodiment of the invention, there is a device adapted to automatically control vehicle speed, comprising a processor adapted to receive at least a first signal indicative of a first local required speed, a second signal indicative of a second local required speed received after the first signal, and a third signal indicative of a value of a current set vehicle speed, wherein the processor includes logic (that is hardware and or software) to automatically determine a new set vehicle speed based at least on the first local required speed, the second local required speed, and the current set vehicle speed, and automatically initiate output of a signal to a vehicle speed controller to change the vehicle speed to a new set vehicle speed.

In another embodiment of the present invention, there is a method for automatically controlling vehicle speed, comprising automatically determining a first local required speed, automatically determining a second local required speed, automatically determining a current set vehicle speed, automatically determining a new set vehicle speed based at least on the first local required speed, the second local required speed, and the current set vehicle speed, and automatically changing the vehicle speed to a new set vehicle speed.

In another embodiment of the invention, there is a device adapted to automatically control vehicle speed, comprising a processor adapted to receive at least a first signal indicative of a first average speed of vehicles proximate to the vehicle, a second signal indicative of a second average speed of vehicles proximate to the vehicle received after the first signal, and a third signal indicative of a value of a current set vehicle speed, wherein the processor includes logic to automatically determine a new set vehicle speed based at least on the first average speed, the second average speed, and the current set vehicle speed, and automatically initiate output of a signal to a vehicle speed controller to change the vehicle speed to the new set vehicle speed.

In another embodiment of the present invention, there is a device adapted to automatically control vehicle speed, comprising a processor adapted to receive a plurality of first signals indicative of set vehicle speeds and a plurality of second signals indicative of respective required speeds, and a memory adapted to record the set vehicle speeds and the required speeds from at least some of the signals received by the processor such that at least some of the vehicle speeds are linked to respective required speeds, wherein the processor includes logic to automatically determine that a signal received by the processor is indicative of a current required speed and initiate output of a signal to a vehicle speed controller to set a vehicle speed based on the respective set speed linked to the required speed stored in the memory if the required speed stored in the memory is substantially the same as the current required speed.

In yet another embodiment of the present invention, there is a device adapted to automatically control vehicle speed, comprising a processor adapted to receive a plurality of first signals indicative of set vehicle speeds and a plurality of second signals indicative of respective required speeds, and obtain a value indicative of a ratio of the set vehicle speed and the respective required speed from at least some of the signals received by the processor, and a memory adapted to record the value of at least some of the ratios obtained by the processor such that at least some of the ratios are linked to respective required speeds, wherein the processor includes logic to automatically determine that a signal received by the processor is indicative of a current required speed and initiate output of a signal to a vehicle speed controller to set a vehicle speed based on the respective ratio linked to the required speed stored in the memory if the required speed stored in the memory is substantially the same as the current required speed.

BRIEF DESCRIPTION OF THE DRAWINGS

FIGS. 2a and 2b present a graphical representation of vehicle velocity (V) versus time or distance according to an embodiment of the present invention where set speed is changed in a one-to-one relationship with a change in required speed.

DETAILED DESCRIPTION OF THE PREFERRED EMBODIMENTS

Set Speed

Figure 1:
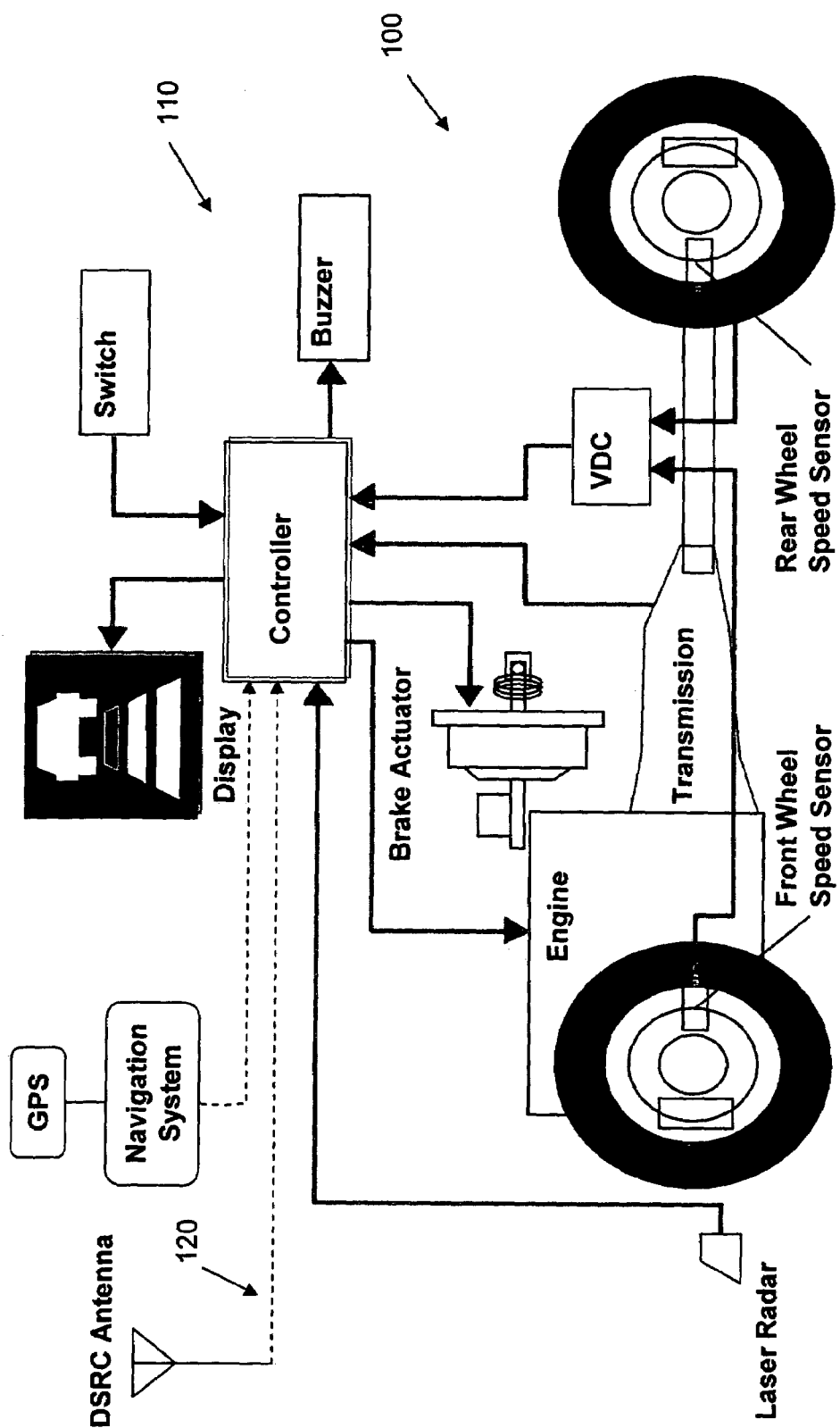
FIG. 1 presents a schematic of an embodiment according to the present invention.

A first embodiment of a cooperative speed control system according to the present invention relates to a system that automatically changes a set speed (V\_set) of a host vehicle, such as that set using the host vehicle's speed control system (e.g., cruise control, adaptive cruise control system (ACC), etc.) to a new set speed (V\_set\_new) based on a change in environmental conditions of the vehicle, such as by way of example, a change in speed limit. The change in environmental condition may be communicated to the vehicle in a variety of ways, such as, for example, via a wireless radio broadcast from an infrastructure communication device received by a radio onboard the host vehicle.

An exemplary scenario implementing the first embodiment will now be described, followed by a more detailed description of some other embodiments of the invention.

In an exemplary scenario, there is a host vehicle 100 that is traveling down a roadway having a cooperative speed control system according to the first embodiment of the present invention that also has a speed control system 110 where the driver has inputted a set speed and/or activated the system in a manner where the set speed of the vehicle speed is set/adjusted automatically (as in, for example, the case of activation of ACC). For the purposes of this scenario, the driver has activated a cruise control system to maintain a set speed (V_set) of 65 miles per hour.

Concurrently, the host vehicle comes into range/passes what will hereinafter be referred to as an infrastructure communication device (described in greater detail below) that communicates a required local speed (V_req) (e.g., the speed limit) to the host vehicle by way of, for example, a radio broadcast sent by the device, that is received by a receiver system 120. For the purposes of this scenario, the current required local speed is 65 miles per hour for the portion of the roadway on which the host vehicle is currently traveling based on a communication received by the last infrastructure communication device passed by the host vehicle. Note that the set speed could have been set before, during or after receipt of the communication from the infrastructure communication device. This required local speed shall be designated V_req1.

The host vehicle later passes/comes into range of another infrastructure communication device that broadcasts a radio signal communication indicative of the required local speed (i.e., speed limit) for that particular stretch of roadway. For example, the infrastructure communication device may broadcast a signal that the required local speed for this particular portion of roadway is 50 miles per hour. This broadcast is received by the vehicle. The required local speed of 50 miles per hour (V_req2) that is communicated by infrastructure communication device represents a change of required local speed from the previously communicated required local speed (V_req1), and thus there is a differentiation in the required local speeds. That is, the new required local speed of 50 miles per hour represents a change in required local speed (ΔV_req) of negative 15 miles per hour (ΔV_req=−15 mph). The differentiation in speed is thus negative 15 miles per hour. This change in speed is calculated or otherwise determined by the cooperative speed control system.

The cooperative speed control system then automatically adjusts the set speed to a new set speed (V_set_new) based on the change of the required local speeds. In this scenario, the new set speed (V_set_new) would be a speed reduced by 15 miles per hour from the previously set speed (V_set), owing to the reduction in the required speeds (V_req1=65 to V_req2=50 mph). Thus, the new set speed (V_set_new) would be 50 miles per hour. The suitable methods, devices and systems used to determine the new set speed shall now be specifically detailed.

In a first exemplary embodiment, the change in the set speed (ΔV_req) has a one-to-one or substantial one-to-one relationship to the change in the required speeds. For example, in the above scenario where V_req1 is 65 miles per hour and V_req2 is 50 miles per hour, the difference in speed ΔV_req would be negative 15 miles per hour. Thus, according to one exemplary embodiment, V_set, which was previously set at 65 miles per hour, would now be changed to 50 miles per hour (i.e., V_set_new=50 mph). Still further by example, following the one-to-one relationship in ΔV_req, if V_set was previously set at 60 miles per hour in the above scenario (i.e., the current set speed of the speed control system was 5 miles per hour below V_req1) the new set speed (V_set_new) would now be 45 miles per hour. That is, V_set would still be reduced by 15 miles per hour from the previously set speed, reflecting a one-to-one change in speed of the required local speed. Thus, according to this exemplary scenario, V_set_new may be determined based on the equation $$V\_set\_new = V\_set + \Delta V\_req \quad (1)$$

where $$\Delta V\_req = V\_req2 - V\_req1 \quad (2).$$

Thus, according to this embodiment of the invention, any change in the required local speed will result in a one-to-one change in V_set. Note further that while the previous scenarios have been described where the required speed decreases, if the required speed increases, ΔV_req would be a positive number, and thus V_set_new would increase by that positive number. FIG. 2a and FIG. 2b schematically illustrate the change in speed based on the just described scenario.

Figure 3:
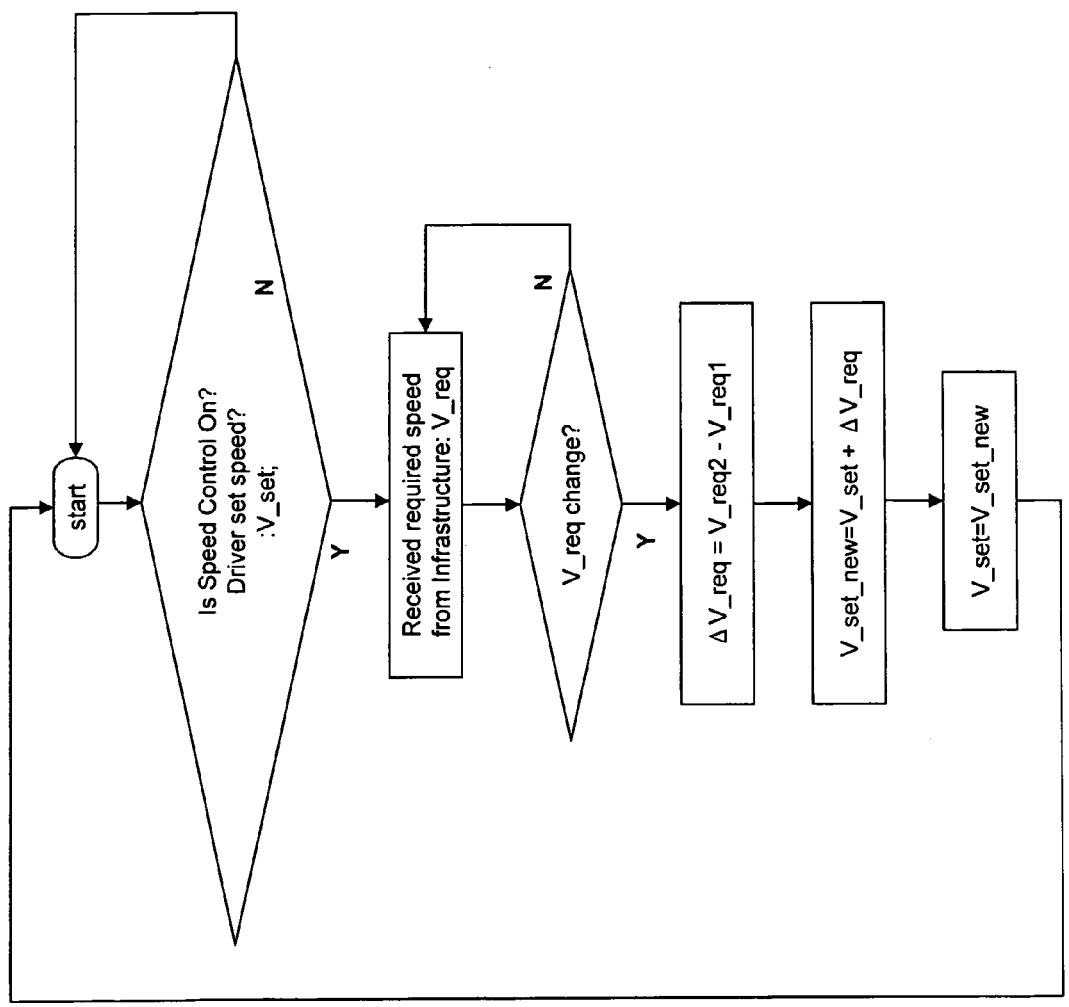
FIG. 3 presents a flow chart for an algorithm to implement an embodiment of the present invention where set speed is changed in a one-to-one relationship with a change in required speed.

FIG. 3 presents an algorithm that may be used during implementation of the embodiment just described.

In a second embodiment according to the present invention, the set speed (V_set) is again changed based on a differentiation in speed between the first required speed (V_req1) and the second required speed of the vehicle (V_req2). However, the differentiation in speed is now in the form of a ratio of the second required speed to the first required speed. That is, the new set speed is determined based on a ratio of the second required speed (V_req2) and the first required speed (V_req1). That is, instead of changing the set speed by the exact difference between V_req1 and V_req2 in a one-to-one relationship, the set speed is changed by adjusting to the set speed based on a ratio of V_req2 and V_req1. Thus, V_set_new may be determined based on the equation $$V\_set\_new = V\_set * \alpha\_\Delta V \quad (3)$$

where $$\alpha\_\Delta V = V\_req2 / V\_req1 \quad (4).$$

In an exemplary scenario according to this second embodiment, if V_req1 is 65 miles per hour, and V_req2 is 50 miles per hour, α_ΔV would be about 0.77 (50 divided by 65). That is, according to the second embodiment of the invention, V_set_new would be roughly 77% of the value of V_set. Thus, by multiplying V_set by 0.77, V_set_new may be obtained. If, for example, V_set is 60 miles per hour, V_set_new would be 46 miles per hour (as opposed to 45 miles per hour in a one-to-one change relationship), as may be determined based on the above equation.

Figure 4A:
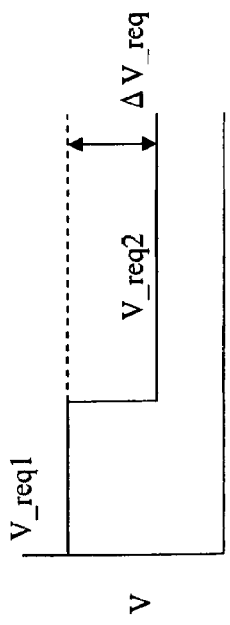
FIGS. 4a, 4b and 4c present a graphical representation of vehicle velocity (V) versus time or distance according to another embodiment of the present invention where set speed is changed based on a ratio of required speeds.
Figure 4B:
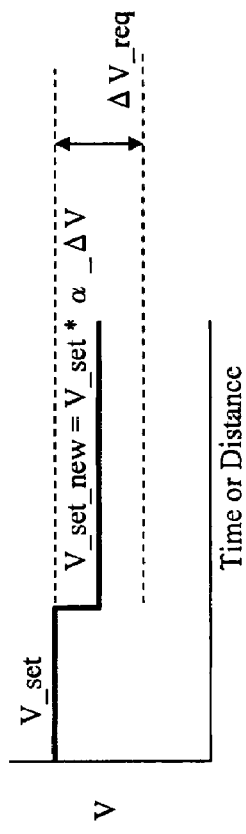
Figure 4C:
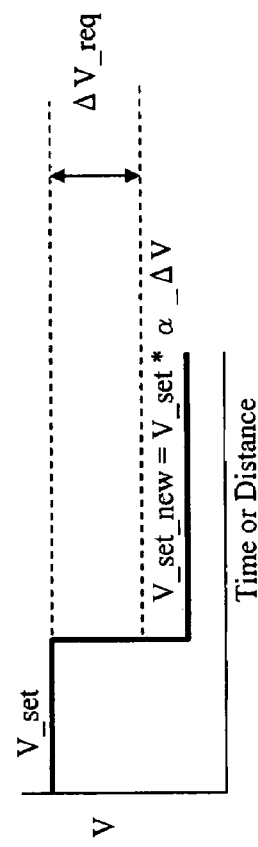

FIG. 4a shows a schematic of the change in required local speeds, where the change ΔV_req, is superimposed on FIGS. 4b and 4c, which depict how V_set_new may vary when practicing this embodiment. FIG. 4b shows how V_set changes based on the ratio of V_req2/V_req1, where V_set of FIG. 4b is a value lower than V_req1, and thus the change in the set speed is smaller than ΔV_req. Conversely FIG. 4C shows a scenario where V_set is higher than V_req1, and thus utilizing the ratio V_req2/V_req1, V_set changes by an amount that is greater than ΔV_req.

Figure 5:
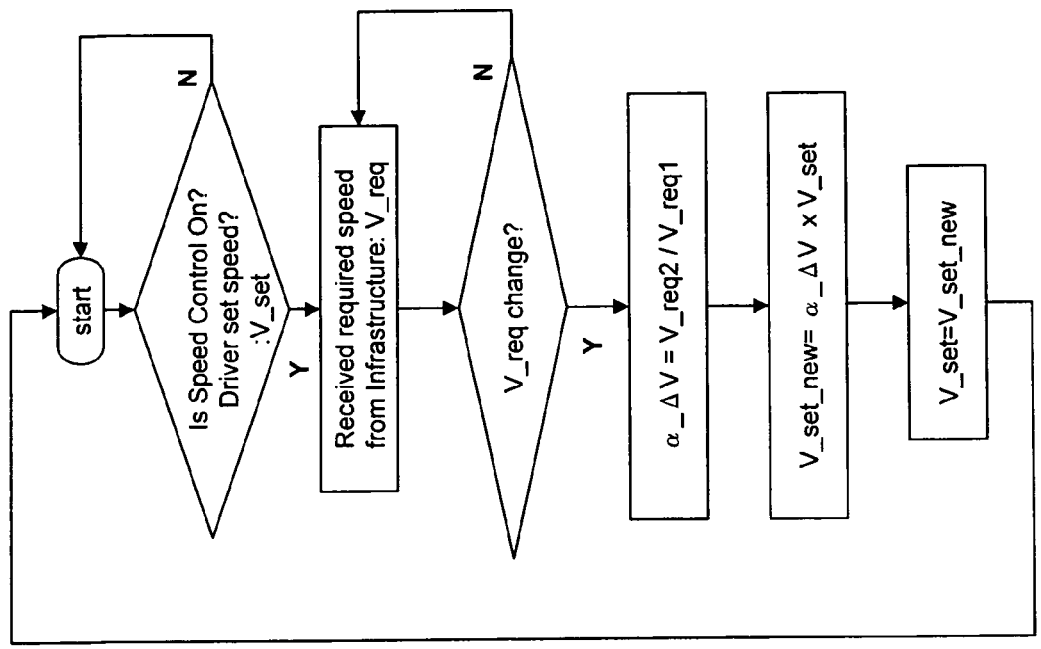
FIG. 5 presents a flow chart for an algorithm to implement another embodiment of the present invention where set speed is changed based on a ratio of required speeds.

FIG. 5 presents an exemplary algorithm for implementing the second embodiment of the invention.

Figure 6:
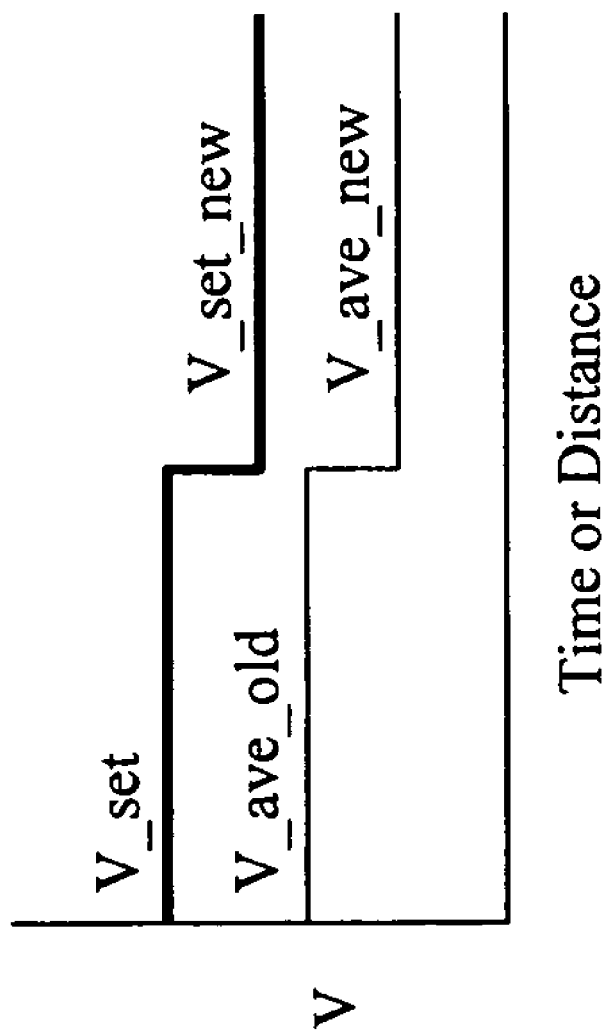
FIG. 6 presents a graphical representation of vehicle velocity (V) versus time or distance according to another embodiment of the present invention, where the set velocity of the host vehicle is changed in a one-to-one relationship with a change in average speeds of vehicles proximate the host vehicle.
Figure 7:
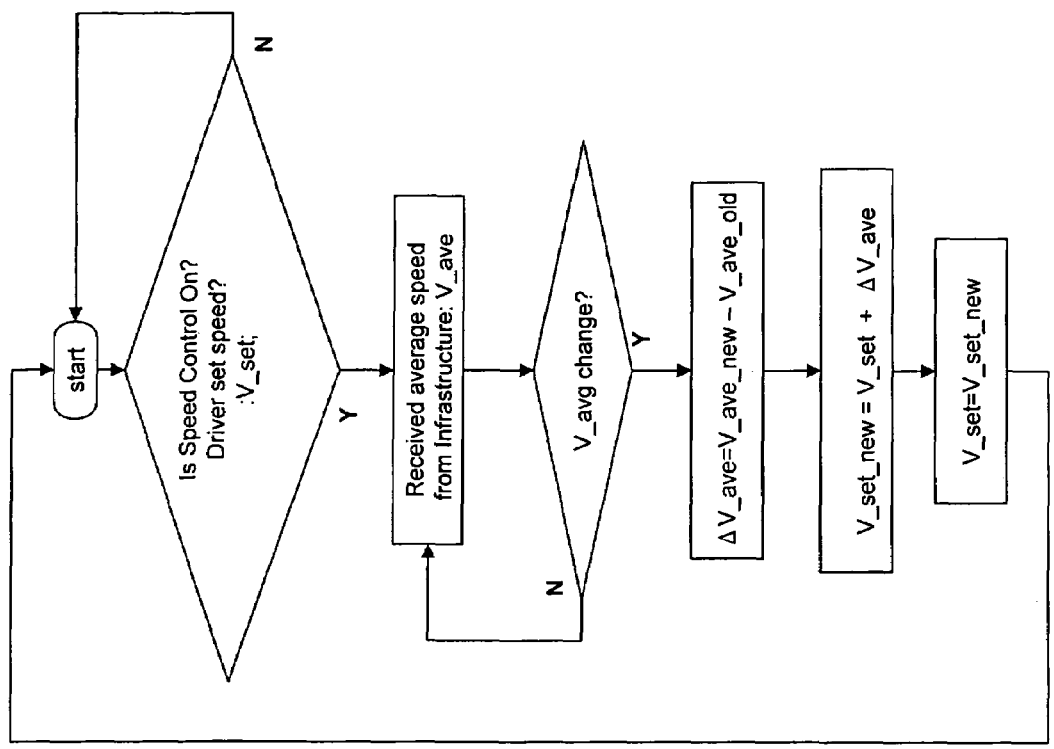
FIG. 7 presents a flow chart for an algorithm to implement another embodiment of the present invention, where the set velocity of the host vehicle is changed in a one-to-one relationship with a change in average speeds of vehicles proximate the host vehicle.

In another embodiment of the present invention, there is a cooperative speed control system that relies on information relating to the speed of vehicles around the host vehicle. By way of example, if the average speed of the cars proximate/around the host vehicle, for example, the ten closest cars to the host vehicle, or, for example, all the cars within a 300 foot radius of the host vehicle on the same roadway as the host vehicle traveling in the same direction as the host vehicle (300 feet in-front of, 300 feet in-back of, and along side of the host vehicle within the lanes of direction of travel) is 65 miles per hour during a first period of time, and then the average speed of vehicles proximate/around the host vehicle changes to 50 miles per hour during a second period of time, there would be a difference between the first average velocity (V_ave_old) and the second average velocity (V_ave_new) of 15 miles per hour. In some embodiments of the present invention, the set speed may be changed to a new set speed by subtracting 15 miles per hour from the set speed, in a manner similar to equations (1) and (2) above. Thus, if the set speed was 60 miles per hour, the new set speed would be 45 miles per hour. Of course, in other embodiments of this invention, the set speed may be adjusted in other ways, such as obtaining a ratio of the second average speed to the first average speed, and obtaining V_set_new in a manner similar to equations (3) and (4). FIG. 6 shows a schematic representation of a change in V_set as compared to V_ave_old and V_ave_new, where there is a one-to-one relationship to the change in V_ave_old and V_ave_new. FIG. 7 presents an exemplary algorithm for implementing this embodiment of the invention based on a one-to-one relationship of the change in average speeds of proximate vehicles to the change in set speeds. Of course, other algorithms may be used to obtain a change in set speed based on a ratio between the average speeds, etc.

Figure 8:
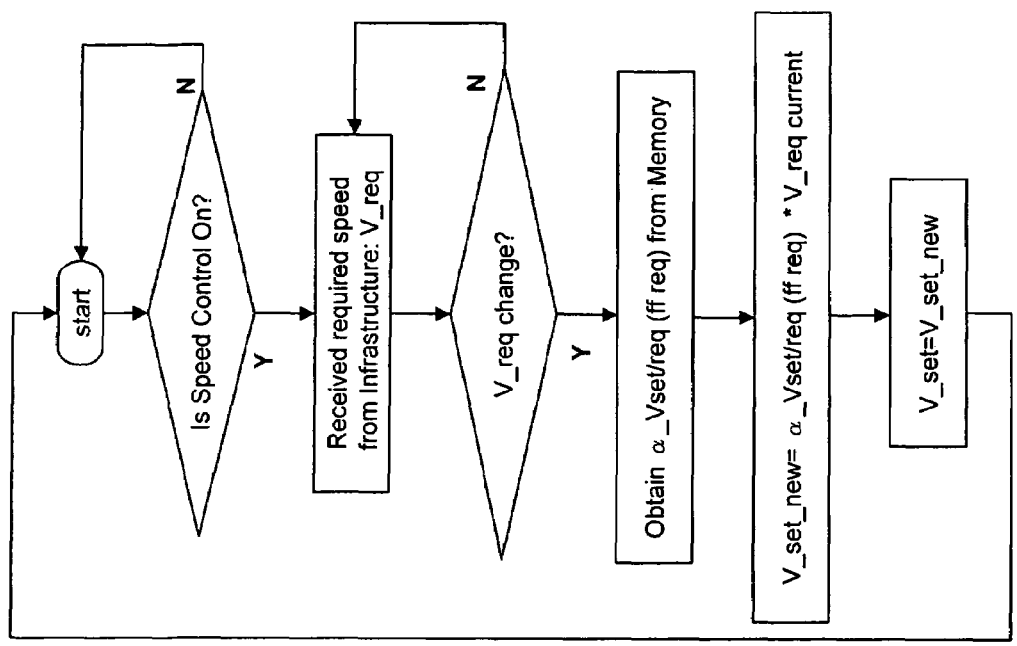
FIG. 8 presents a flow chart for an algorithm to implement another embodiment of the present invention, where the set velocity of the host vehicle is changed based on a ratio of set velocity to required speed as a function of required speed.

In yet another embodiment of the invention, the cooperative speed control system comprises a system that records or otherwise learns drivers' set speeds as a function of required speeds. For example, such a system may include a memory that stores the current set speed and also stores the current required speed, where the two are linked. In a cooperative speed control system according to such an embodiment, when the system is engaged, the system may, upon receiving the required current speed from the infrastructure communication device, look up from the memory the set speed that is linked to the required current speed, and then set the new set speed (V_set_new) of the vehicle at the respective recorded speed. In an exemplary scenario, where, for example, the memory has recorded, for a required local speed of 65 miles per hour, that the driver usually sets the speed setting at 60 miles per hour, if the required speed is 65 miles per hour, the host vehicle set speed will be 60 miles per hour. If the memory has recorded that for a local required speed of 30 miles per hour, the driver sets the speed at 29 miles per hour, the host vehicle set speed will be 29 miles per hour. In other embodiments, a ratio may be stored in the memory, where the ratio is the ratio of the set speed to the required speed. For example, if the driver usually sets the speed at 60 miles per hour when the required speed is 65 miles per hour, a ratio of about 0.92 will be recorded for a required speed of 65 miles per hour. If the vehicle later drives in an area where the required speed is 65 miles per hour, the system will look up the ratio from the memory for a required speed of 65 miles per hour, and multiple the required speed by the ratio, thus obtaining 60 miles per hour in the current scenario. In other embodiments of the present invention, a difference in speed may be recorded in the memory. For example, in the above scenario, instead of a ratio, a value of minus 5 miles per hour will be recorded for a speed of 65 miles per hour. Thus, if the vehicle encounters a section of road where the required speed is 65 miles per hour, the system will obtain from the memory the difference in the speed for 65 miles per hour, and adjust the set speed accordingly, which in this case is 5 miles per hour lower than the set speed, and thus the set speed will be 60 miles per hour. FIG. 8 presents an exemplary algorithm for implementing an embodiment of the speed control system just described. As may be seen, the ratio $\alpha\_Vset/req$ is a function of the current required speed. The flow chart presented in FIG. 8 presents $\alpha\_Vset/req$ (ff req) as a function of the required speed and is retrieved from memory.

Embodiments of the present invention include devices, methods, and systems adapted to automatically control vehicle speed according to one or more of the embodiments described herein. For example, in some embodiments there will be a device with a processor that is adapted to receive data signals and output control signals after analyzing the received signals. The processor typically includes logic in the form of hardware and/or software. For example, the processor may include logic to determine a new set vehicle speed based on its determination of the local required speeds as determined from an evaluation of received signals indicative of the local required speeds. By signal indicative of a local required speed, it is meant any input into the processor that may be used by the processor to automatically determine any set vehicle speed. Such signals may include, but are not limited to, electronic signals. For example, a signal received by a processor could be a voltage signal where, for example 2.5 volts is indicative of a local required speed of 30 miles per hour, and 5 volts is indicative of a local required speed of 60 miles per hour, etc. Digital signals may also be received by the processor according to some embodiments of the invention, where the digital signals are indicative of various required speeds.

In some embodiments of the present invention, the processor is adapted to automatically determine new set vehicle speeds based on, for example, a first local required speed, a second local required speed, and the current set vehicle speed. For example, in the exemplary processor just described, where a new set vehicle speed is automatically determined based at least on the first local required speed, the second local required speed and the current set vehicle speed, the processor may determine a new set vehicle speed utilizing any information related to these three variables. That is, as long as the processor is manipulating data that is related to the first local required speed, the second local required speed, and the set speed, the processor is determining a new set vehicle speed based at least on the first local required speed, the second local required speed, and the set speed.

In another embodiment of the present invention, the processor is further configured to automatically initiate output of a signal to a vehicle speed controller to change the vehicle speed to the determined new set vehicle speed. Again, this outputted signal may take a variety of forms, providing that the outputted signal may be used to control the speed of the vehicle. Accordingly, some embodiments of the present invention also include a vehicle equipped with a processor as described herein and a vehicle with a vehicle speed controller in communication with a processor described herein. For example, the present invention may operate with a vehicle that has a speed control system such as a cruise control system, an adaptive cruise control system (ACC), etc.

In order for a processor to function to implement some of the embodiments disclosed herein, a processor according to some embodiments of the present invention includes logic to determine a differentiation in speed between the second local required speed and the first local required speed, where in some embodiments of the present invention, such as the first embodiment detailed above, the differentiation in speed is determined by subtracting the first local required speed from the second local required speed. Thus, if the first local required speed is greater than the second local required speed, a negative value for differentiation in speed will be obtained. The new set vehicle speed may be determined by adding the differentiation in speed (a negative number) to the current set vehicle speed, thus resulting in a new set vehicle speed that is lower than the current set vehicle speed. Note that the present invention may be alternatively practiced by subtracting the second local required speed from the first local required speed, and thus if the first local required speed is a number greater than the second local speed, a positive value will be obtained. The new set vehicle speed may now be determined by subtracting the differentiation in speed from the current set vehicle speed. Thus, through simple algebraic manipulation, the end result is the same. Thus, an embodiment of the present invention includes obtaining a value for the differentiation in speed that is "equivalent" to a value determined by subtracting the first local speed from the second local speed. By use of the term "equivalent," it is meant that any algebraically appropriate method may be used to obtain the value. Thus, subtracting the first local required speed from the second local required speed is equivalent to subtracting the second local required speed from the first local required speed if the results are used properly. Other equivalent algebraic operations would also be covered by the term "equivalent."

In some embodiments of the present invention, the device adapted to automatically control vehicle speed includes a memory. This memory may be used to store variables such as the current required speed and/or the current set speed, etc. This memory may also store calculated variables that will be used at a later time. By way of example, if the current set speed is known and the current required speed is known, a differentiation in speed value may obtained by dividing the current set vehicle speed by the current (first) local required speed and stored in the memory such that when the required speed changes to the second local required speed, all that is necessary is to multiply the second local required speed by the already determined differentiation in speed, where the determined differentiation in speed may be readily obtained from the memory.

Embodiments of the present invention also include the use of a look-up table to determine various values. For example, a value indicative of a differentiation in speed between the second local required speed and the first local required speed that is equivalent to a value determined by subtracting the first local required speed from the second local required speed may be obtained by utilizing a look up table for such values as opposed to actually subtracting the values.

In another embodiment of the present invention, there is a device adapted to automatically control vehicle speed that includes a processor that is adapted to receive signals indicative of average speeds of other vehicles around the vehicle or otherwise proximate to the vehicle. By way of example, the signal(s) may be indicative of the average speed of the ten closest cars to the vehicle, including cars in front of, in back of and to the side of the vehicle.

In some embodiments of the present invention, the average speed of vehicles around/proximate the host vehicle may be utilized to determine a new set vehicle speed. In some embodiments of the present invention, a processor may receive (or calculate internally) a first signal indicative of a first average speed of vehicles proximate to the host vehicle and then receive (or calculate internally) a second signal indicative of the second average speed of vehicles proximate to the host vehicle. This second signal would be received (or calculated) after the first signal. In such embodiments, the device may automatically determine a new set vehicle speed based at least on the first average speed and the second average speed and the current vehicle speed and then automatically initiates an output of a signal to the vehicle's speed control to change the vehicle speed to the new set vehicle speed.

In some embodiments of the present invention, there is a device adapted to automatically control vehicle speed that includes a processor adapted to receive a plurality of first signals indicative of set vehicle speeds and a plurality of second signals indicative of respective required speeds and adapted to obtain a plurality of values indicative of respective differentiations between at least some of the set vehicle speeds and respective required speeds from at least some of the signals received by the processor. The device further includes a memory adapted to record at least some of the plurality of values indicative of respective differentiations between set vehicle speeds and respective required speeds such that at least some of the differentiations are linked to respective required speeds. The processor includes logic to automatically determine that a signal received by the processor is indicative of a current required speed and initiate output of a signal to a vehicle speed controller to set a vehicle speed based on the respective differentiation linked to the required speed stored in the memory if the required speed stored in the memory is substantially the same as the current required speed.

In an exemplary scenario utilizing the embodiment just described, if the host vehicle typically has a set speed of 60 mph when the required speed is 65 mph, the processor will determine a differentiation in speed (5 mph, 0.92, etc.) and record that differentiation in the memory linked to the respective required speed of 65 mph, thus "learning" the routine of set vehicle speeds for given required speeds. Once the differentiations in speed for specific required speeds is recorded in a memory, the cooperative speed control system utilizes the respective differentiation in speed to obtain the set vehicle speed for a given required speed. For example, if the required speed is 65 mph, the set vehicle speed will be determined utilizing the differentiation for that required speed (5 mph, 0.92, etc.). In other embodiments of the invention, the set vehicle speed will be stored and linked to a required speed such that if, for example, the stored speed is 62 mph for a 65 mph required speed, if the vehicle again encounters a required speed of 65 mph, the new set vehicle speed will be 62 mph.

By "if the required speed stored in the memory is substantially the same as the current required speed," it is meant that the current-required speed may be exactly the same as or close to the required speed stored in the memory, thus limiting signal errors and round-off problems.

Some embodiments of the present invention include a device that is adapted to identify vehicles that are proximate/around the vehicle, determine the speeds of those vehicles and determine the average speed accordingly. However, other embodiments of the present invention include a device that receives, for example, a wireless communication from vehicles around the host vehicle relating to the respective speeds of those vehicles. That is, the vehicles around the host may communicate to the host vehicle their respective speeds, and, upon receiving this communication, the host vehicle may utilize this information to determine the average speed of the vehicles. Passive and active sensors may be used to determine the various speeds of vehicles around/proximate the host vehicle. By way of example, laser, radar, short range wireless communication, etc., may be used. Thus, any device or method which may be utilized to obtain the average speed of vehicles around/proximate to the host vehicle may be used to practice embodiments of the present invention.

In the scenarios described at the beginning of this disclosure, the required speeds (V_req1 and V_req2) were determined based on a received radio signal from an infrastructure communication device. The infrastructure communication device would be used by the government/private entity responsible for roadways to announce the required speed. Alternative methods of determining required local speeds are also applicable to the present invention. For example, advanced image recognition programming may be used to analyze an image of a speed limit sign to determine the required speed. Further, by way of example, bar codes may be placed along a roadway that may be scanned utilizing a laser sensor mounted on the vehicle so that the local required speed may be determined by the vehicle and utilized in the cooperative speed control system according to embodiments of the present invention. Still further, instead of a broadcast radio a broadcast laser may be utilized. In other embodiments of the present invention, map data with speed information linked to GPS coordinates may be preprogrammed into a computer onboard the vehicle and, in conjunction with an onboard GPS device, the local required speeds may be obtained from the map data. In yet other scenarios, information relating to the required speed may be obtained from other vehicles through wireless communication or the like. Any device, method or apparatus that may be used to convey a local required speed to a cooperative speed control system according to the present invention may be used to practice the present invention.

Timing To Change Speed

Another embodiment of the present invention relates to the determination of the time, $\Delta t$, to decelerate or accelerate the host vehicle from a current speed to a new set speed utilizing the cooperative speed control system, and the use of the determined value of the time, $\Delta t$, to change the current vehicle speed to the new set vehicle speed, where the set speed is reduced according to the time $\Delta t$ to obtain the new set speed. Before describing the particulars of this embodiment, an exemplary scenario utilizing an embodiment will first be described, starting with an explanation of the conditions that may benefit from such an embodiment.

Speed limits on a roadway periodically change from one speed limit to another. For example, a speed limit on a first portion of a roadway might be 65 mph, after which a driver may pass a sign that indicates that the speed limit has been reduced to 55 mph. Typical drivers desire that any reduction in speed of their vehicle owing to a change of speed limits be completed by about the time the driver passes the sign indicating the reduced speed. For example, a driver driving at 60 mph in a 65 mph zone but approaching a 55 mph zone (as indicated by a sign reading "55 mph" or the like) who intends to reduce speed due to the change in speed limits will want his or her vehicle to have completely reduced speed by the time the vehicle passes the sign reading 55 mph.

Reduction in speed will, of course, occur over a period of time (as opposed to instantaneous), hereinafter identified as $\Delta t$. Thus, an embodiment of the present invention relates to the determination of the timing required $\Delta t$ to change a vehicle speed from a current vehicle speed to a new set speed so that the new set speed will be obtained by the time the vehicle reaches the location where the required speed changes. Therefore, an embodiment of the present invention relates to determining the time which it takes to reduce speed from a current set speed to a new set speed.

Figure 9:
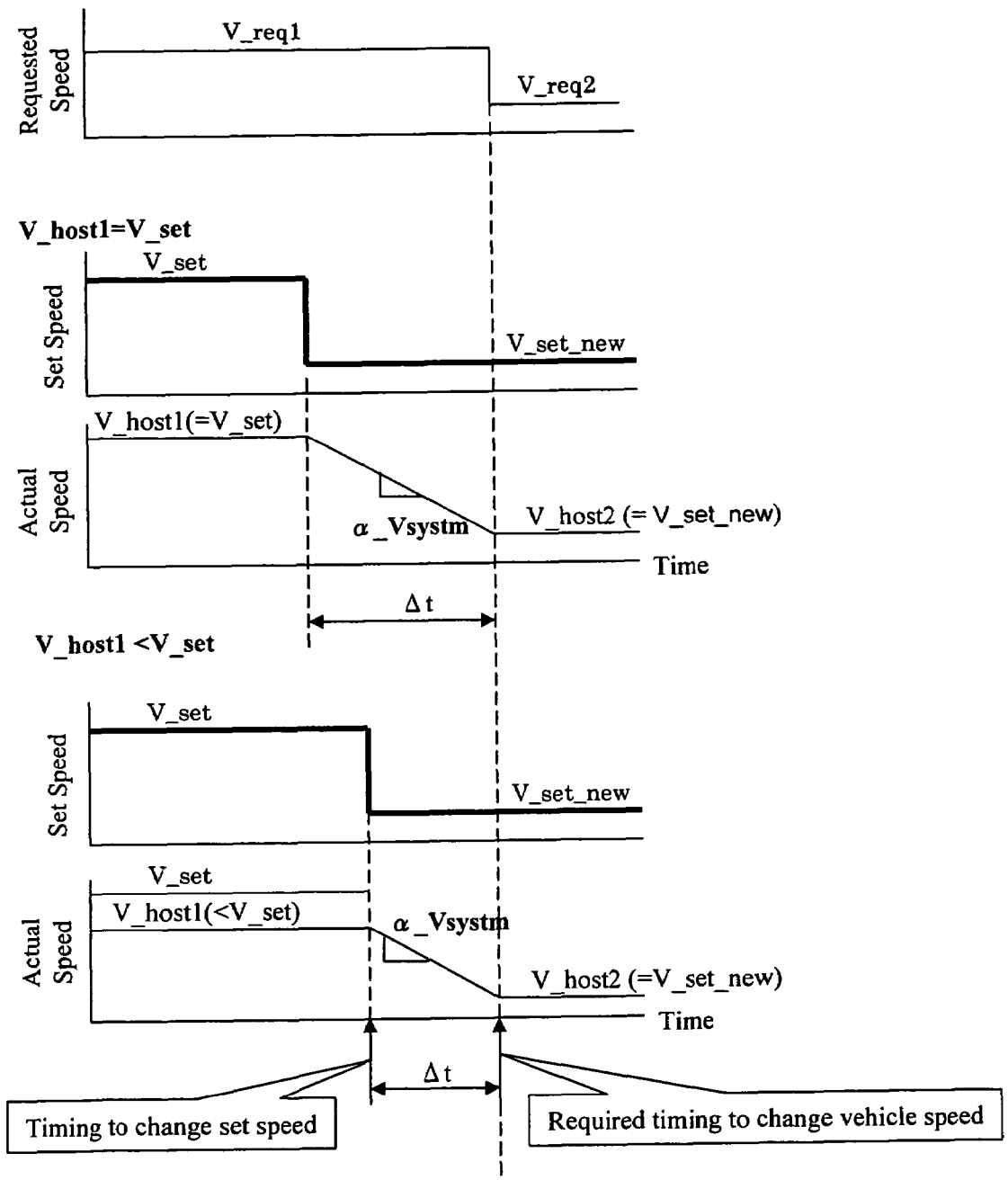
FIG. 9 presents a graphical representation of how time $\Delta t$ varies with host vehicle speed.

In an embodiment of the invention, there is a cooperative speed control system that determines $\Delta t$ based on the host vehicle speed for a constant fixed deceleration. FIG. 9 graphically illustrates how $\Delta t$ may vary, during implementation of this embodiment, based on different current vehicle speeds. In one graph on FIG. 9, the current speed of the host vehicle, V_host1, is equal to the set speed, while in another graph of FIG. 9, the current speed of the host vehicle, V_host1, is less than the set speed. As may be readily seen, the time $\Delta t$ that is required for the vehicle to decelerate from the current speed (V_host1/V_set, etc.) to the new set speed varies depending on the current speed of the host vehicle.

In the first embodiment (the results of implementation being depicted in FIG. 9), $\Delta t$ further varies based on a vehicle acceleration rate $\alpha$_Vsystm. In FIG. 9, the vehicle acceleration rate, $\alpha$_Vsystm, is a negative value (herein, acceleration rates may be both positive for positive acceleration and negative for negative acceleration) owing to deceleration of the vehicle. In this embodiment, $\alpha$_Vsystm is a constant vehicle acceleration rate value that is fixed by system deceleration or acceleration. In this embodiment, the vehicle acceleration rate value $\alpha$_Vsystm is fixed based on a current vehicle component status. By way of example only and not by way of limitation, $\alpha$_Vsystm may be fixed based on the engine rpm, the coefficient of friction of the tire wheels, and/or transmission gear position, etc. In yet other embodiments, $\alpha$_Vsystm may be practiced by torque and/or power characteristics of the engine, vehicle shape that might impact air resistance, electrical load and/or air condition compressor activation that might impact engine RPM, and/or friction between brake pads and rotors (and/or brake drums and shoes), etc. In the case of ACC, $\alpha$_Vsystm is the same for deceleration as coasting deceleration without a target vehicle. This vehicle acceleration rate is treated as an effective constant in determining $\Delta t$. Thus, in the present embodiment, $\Delta t$ is a function of the current vehicle speed V_host1, the new set speed V_set_new, and the vehicle acceleration rate, $\alpha$_Vsystm.

Figure 10:
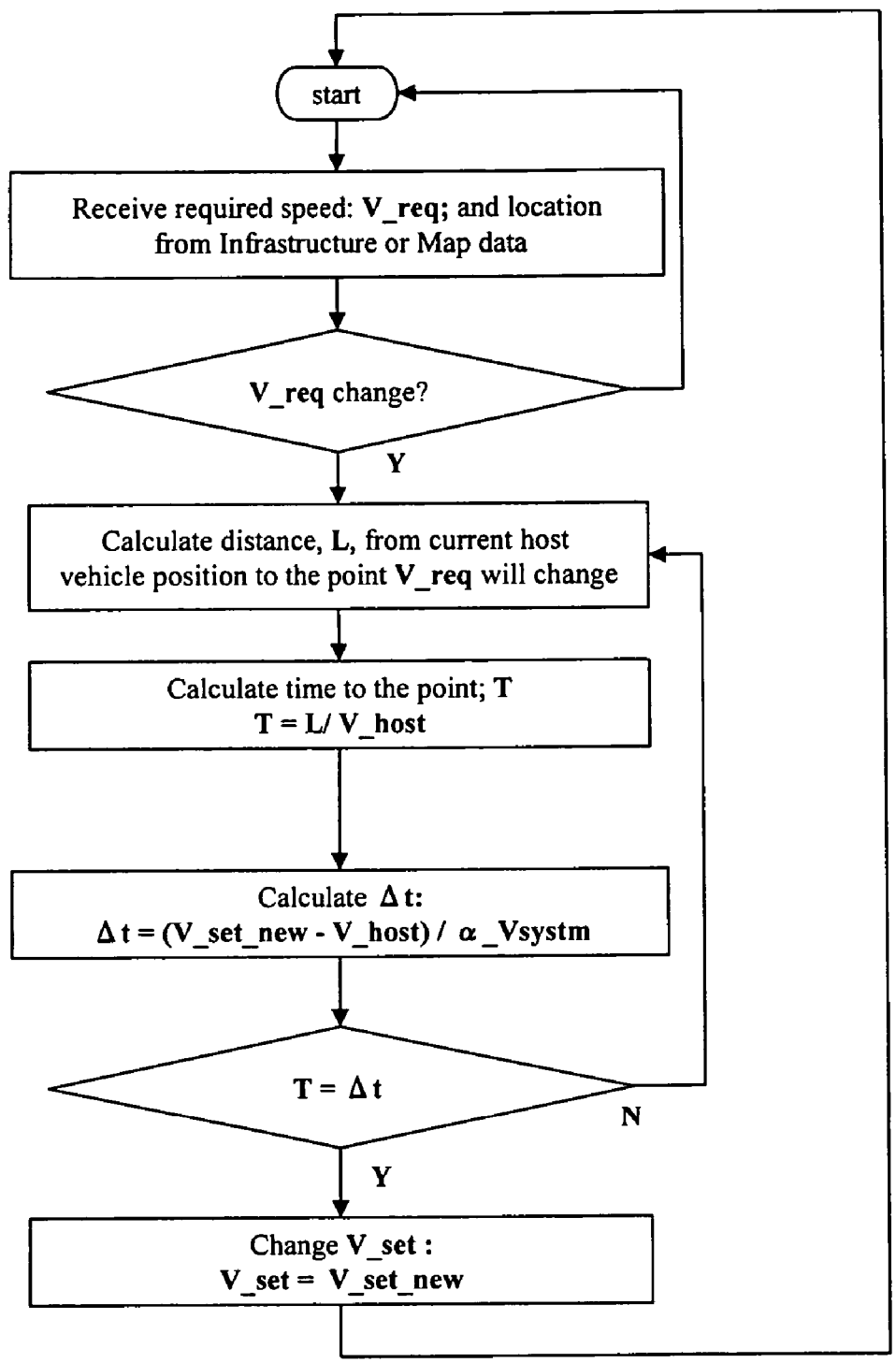
FIG. 10 presents an exemplary algorithm for changing set speed based on $\Delta t$.

FIG. 10 presents an exemplary algorithm for determining $\Delta t$. According to the algorithm presented in FIG. 10, when the cooperative speed control system determines that a required speed has changed from a first required speed to a second required speed, the time to the location at which the required speed will change to the second required speed based on the current speed of the host vehicle is calculated utilizing the equation $$T = L/V\_host, \qquad (5)$$

where L is a distance between (i) the current vehicle position and (ii) the position where the first local required speed changes to the second local required speed. V_host is the current speed of the vehicle. (It is noted that, as is the case in the scenarios of FIG. 9, V_host may or may not be the same as V_set.)

$\Delta t$ may be obtained based on the following equation $$\Delta t = (V\_set\_new - V\_host)/\alpha\_Vsystm \qquad (6)$$

where V_set_new is the value of the vehicle speed that will be set by the speed control system as a result of the change in required speeds. By way of example, in the case of a one-to-one change in the required speed to set speed, if the required speed decreases by 10 miles an hour the set speed will likewise decrease by 10 miles an hour to the new set speed. It is noted that the new set speed, V_set_new, may be determined utilizing one or more of the embodiments described herein.

According to the exemplary algorithm of FIG. 10, T may be calculated a number of times until convergence with $\Delta t$ is obtained (where T grows smaller owing to the continual reduction in L assuming constant V_host1). By convergence it is meant that the time T and the time Δt are substantially equal to each other. That is, Δt equals T and/or Δt is effectively similar to T such that the cooperative speed control system may be effectively utilized (e.g., this addresses round-off errors, etc). If T is not determined to be substantially equal to Δt in the first run through of the algorithm, as noted above, values T may be recalculated until convergence is obtained. Once convergence is obtained, the speed of the vehicle is changed by a vehicle speed controller so that the host vehicle speed becomes the new set vehicle speed. The cooperative speed control system according to this embodiment may initiate a control regime where the speed of the host vehicle is gradually reduced based on the vehicle acceleration rate value α_Vsystm until the speed of the host vehicle equals the new set vehicle speed (as may be readily seen from FIG. 9). Alternatively, in a scenario where V_set_new is greater than V_set and α_Vsystm is positive, the cooperative speed control system may implement a speed control regime such that the vehicle speed is gradually increased, according to the vehicle acceleration rate value, until V_set_new is reached.

Another embodiment of the present invention relates to a scenario where the time to decelerate/accelerate, Δt, owing to a change in a first required speed to a second required speed, may vary based on the presence of caution zones associated with the required speed reduction/increase associated with the change in required speed. Again, starting with an exemplary scenario, when traveling towards such caution zones as intersections, traffic lights, crosswalks and/or locations where a driver may anticipate that he or she will bring the vehicle to a complete stop or close to a complete stop, etc., the time to decelerate, Δtd (for deceleration Δt=Δtd, for acceleration, Δt=Δta), might be larger than other situations. This is because, for example, drivers often vary their vehicle's deceleration rate based on whether the vehicle is traveling towards an area where extra caution may be needed. For example, if a driver is approaching a crosswalk for a school zone, a driver may begin to decelerate his vehicle long before such deceleration might typically be necessary to smoothly/safely decelerate the vehicle to the new required speed. This is especially the case in a situation where the posted required speed change is in close proximity to the caution zone generating the required speed change but where the driver can readily see the caution zone and might take action to reduce the vehicle speed even without a change in required speed. For example, in a scenario where a driver approaches a school zone where a sign indicating a reduced required speed (V_req2) is a very short distance from the school zone crosswalk, a driver will probably begin decelerating his or her vehicle in a manner that will extend the time of deceleration. That is, the driver may begin to decelerate at a point in time long before that which would be necessary to safely or smoothly decelerate to the new required speed, thus extending Δt (or Δtd).

When a driver begins to reduce speed at a greater time than normal, it has the negative effect that a vehicle in back of the driver may approach closer than normal. Still further, in the case of high density traffic zones, such as may be found in front of toll gates, work zones and school zones adjacent roadways that typically experience a high density of traffic, where commencing speed reduction often occurs sooner than "normal," this early reduction in speed may generate traffic congestion caused by "shockwaves" in back of the vehicle (i.e., due to the host vehicle slowing down, cars in back of the host vehicle slow down, and this creates a shockwave effect in that vehicles continue to slow down even after the host vehicle has increased speed). Accordingly, an exemplary embodiment according to the present invention addresses this by varying the time to decelerate (and accelerate, as will be explained below) according to different conditions (the encounter of different caution zones, etc.) that warrant a reduction (or increase) in the speed of the host vehicle.

Figure 11:
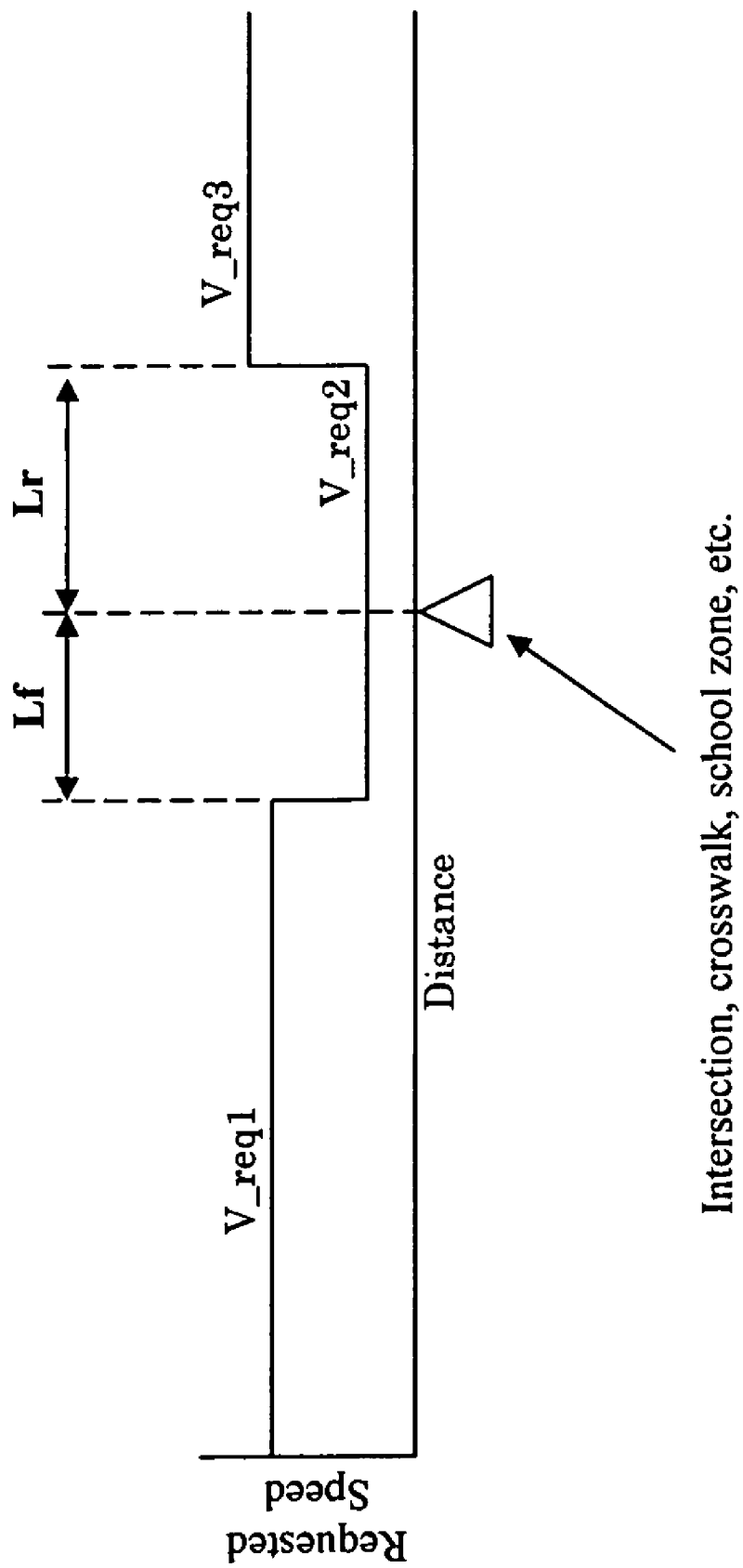
FIG. 11 presents a graphical representation of distances from a caution zone to locations where required speed changes.

FIG. 11 illustrates the situation where V_req1 changes to V_req2 at a distance Lf in front of a caution zone, such as, for example, an intersection, crosswalk, school zone, etc. FIG. 11 also illustrates how the required speed increases from V_req2 to V_req3 at a distance Lr from the safety zone.

Figure 12:
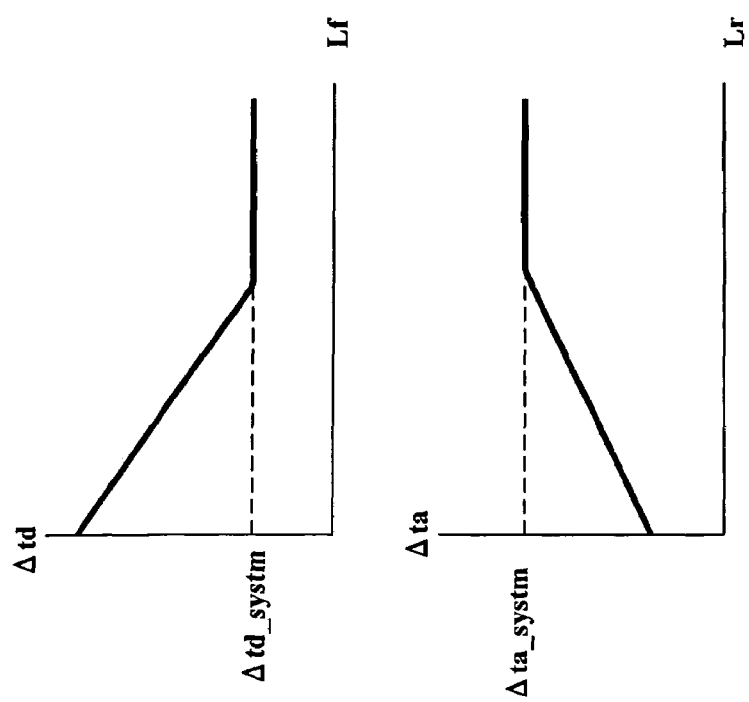
FIG. 12 presents a change in $\Delta t$ as related to distance from a caution zone according to an embodiment of the present invention.

An embodiment of the present invention utilizes the variances in the values of Lf and Lr (i.e., variations in distances from the location at which the required speed changes to the caution zone), and correlates these distances to a time required to decelerate (Δtd) or accelerate (Δta) in reaction to the change in the required speeds, to determine a value for Δt that may be used to change the vehicle speed to the new set vehicle speed. FIG. 12 presents an example of the correlation of Δtd with Lf and the correlation of Δta with Lr in an exemplary embodiment according to the present invention. The values for Δtd and Δta may be predetermined and stored in a database onboard the vehicle and/or may be broadcast to the vehicle from an infrastructure communication device. The values Δtd and Δta, as they correlate to Lf and Lr respectively, may be determined through empirical testing and/or through computational techniques. It will be noted that in FIG. 12, Δtd linearly decreases with increasing Lf until it reaches a certain value Δtd_systm, at which point it levels off and is a constant for greater values of Lf. Conversely, Δta gradually increases with increasing Lf until a certain value Δtα_systm, at which point it levels off and remains constant for increasing values of Lr. The variables Δtd_systm and Δta_systm are values fixed by the system's deceleration/system's acceleration, etc. In the case of ACC, system deceleration is the same as coasting deceleration without a target vehicle, and system acceleration is the same as acceleration without a target vehicle. In some embodiments, such decelerations and accelerations may be fixed so that vehicle occupants do not feel uncomfortable. By way of example only and not by way of limitation, the maximum value for Δtd when Lf=0 (e.g., minimum deceleration), and the minimum of Δta when Lr=0 (e.g., maximum deceleration) might be fixed so that vehicle occupants do not feel uncomfortable or uneasy/anxious.

Figure 13:
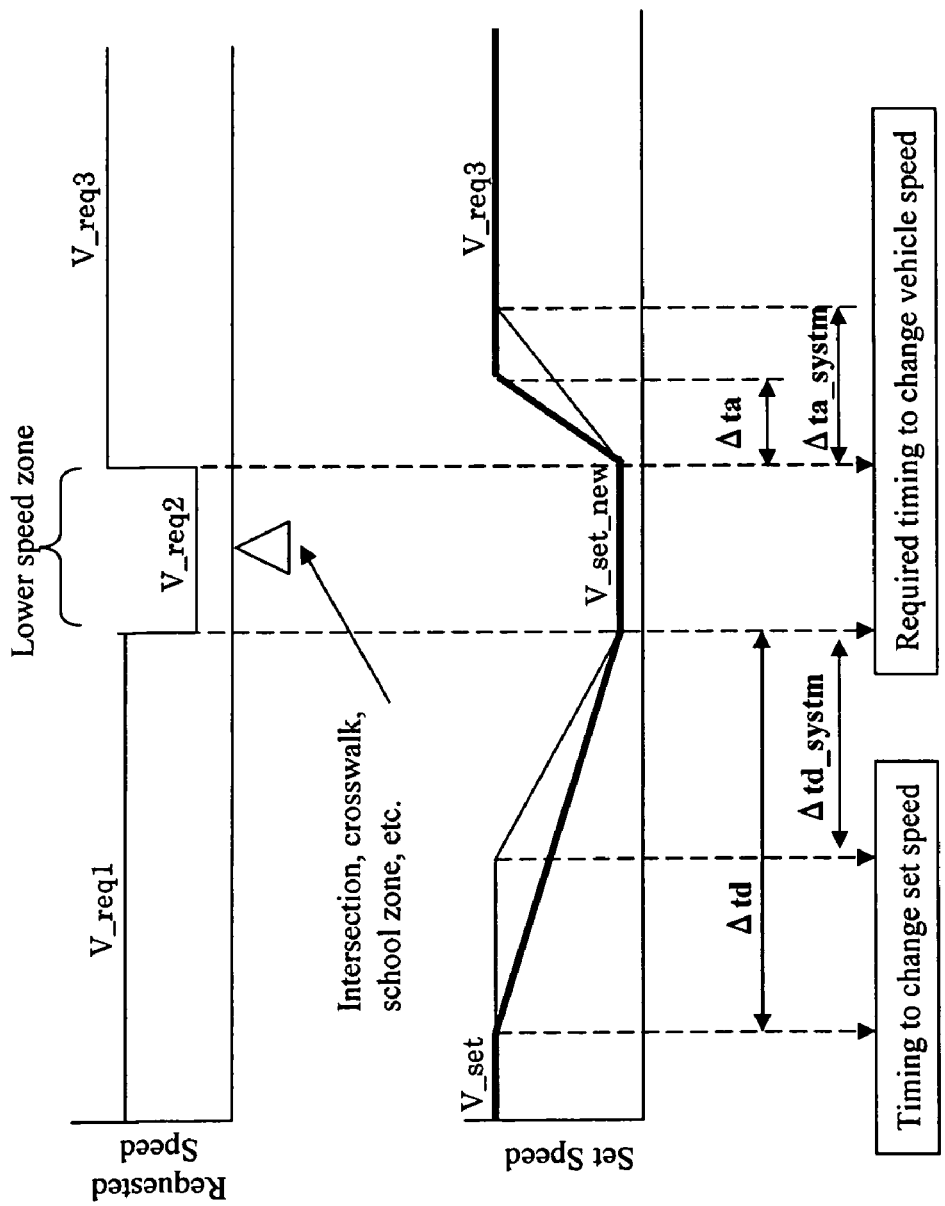
FIG. 13 presents a graphical representation of how time $\Delta t$ varies with varying distances of speed change locations from a caution zone according to an embodiment of the present invention.

FIG. 13 presents a schematic representation of how Δtd and Δta may vary as compared to respective Δtd_systm and Δta_systm values. FIG. 13 portrays a scenario where a longer deceleration time (Δtd) is desired than that which would be provided by Δtd_systm. Still further, FIG. 13 presents a scenario where a shorter acceleration time Δta is desired than that which would be provided by Δta_systm, such as may be the case to ensure that traffic flows as smoothly as possible to prevent traffic jams associated with the caution zone down road from the caution zone thus reducing the deterioration in traffic flow.

Figure 14:
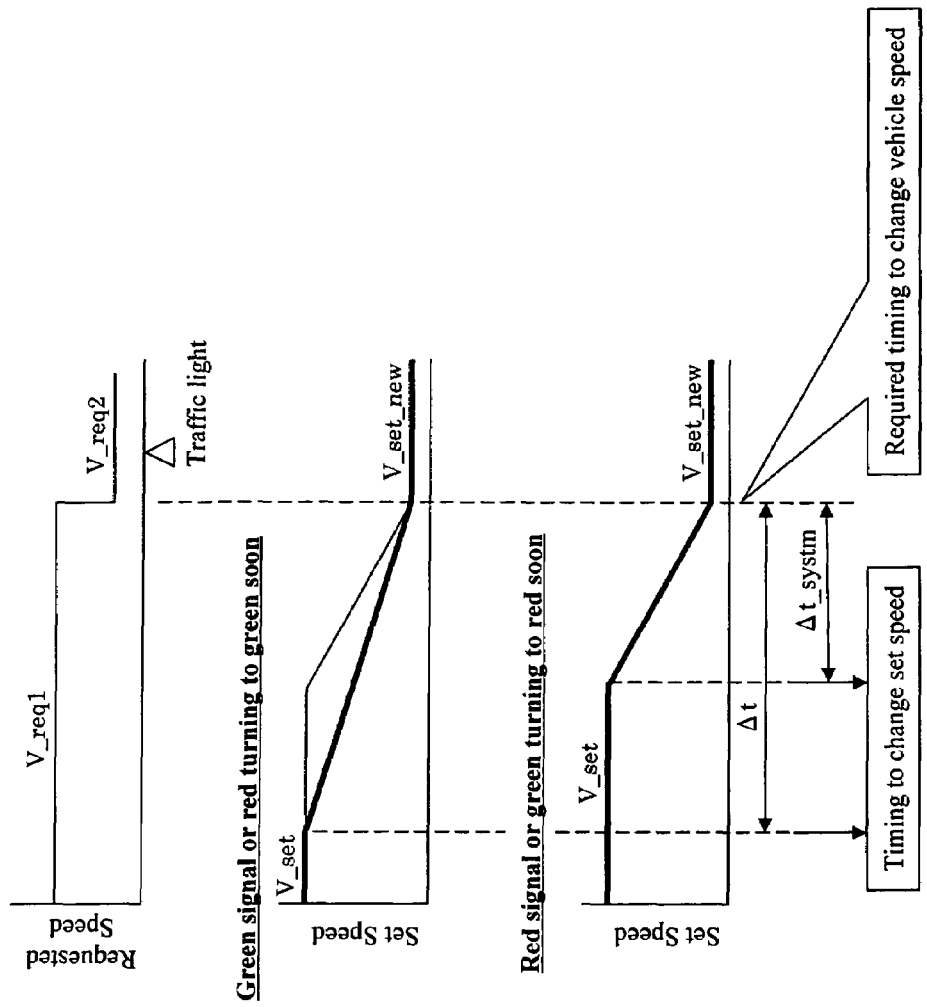
FIG. 14 presents a graphical representation of how host vehicle speed may vary based on a condition of a caution zone according to an embodiment of the present invention.

Some embodiments of the invention further relate to the type of caution zone/the status of the caution zone that the vehicle is approaching. FIG. 14 presents a schematic representation of how the timing to change the vehicle speed to the set speed varies for a traffic light at an intersection that is red (i.e., indicating that traffic should stop) as compared to green (indicating that traffic should proceed). In an embodiment, if the host vehicle is approaching a red signal, Δt will equal Δt_systm.

Figure 15:
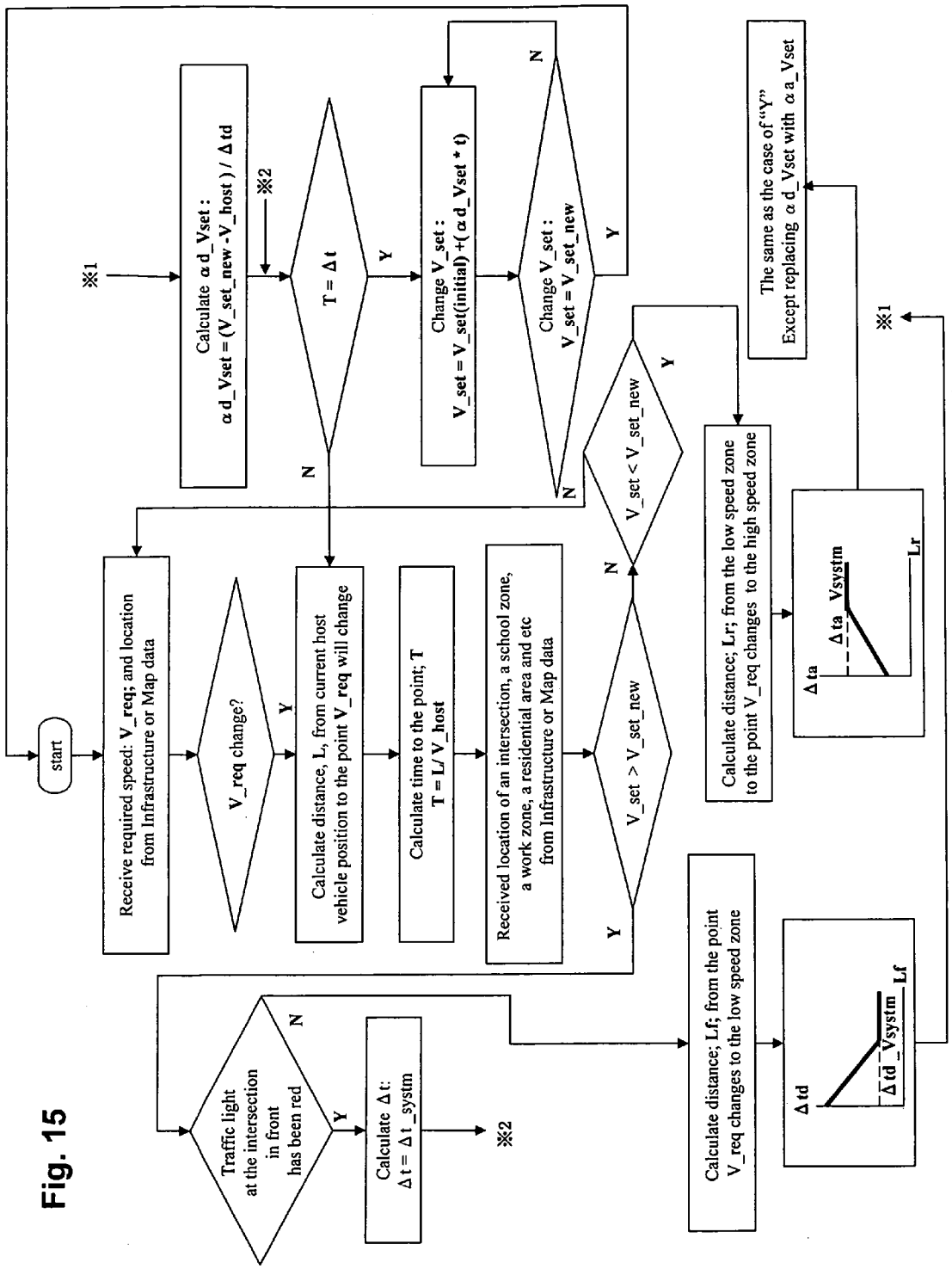
FIG. 15 presents an exemplary algorithm for changing set speed based on varying values of $\Delta t$.

FIG. 15 presents an algorithm for implementing an embodiment of the present invention relating to variable deceleration and acceleration times when approaching caution zones and driving away from caution zones. The algorithm shown on FIG. 15, when implemented in a cooperative speed control system according to the present invention, first determines whether there is a change in required speed. If there is a change in the required speed, the system determines the distance L from the current location of the host vehicle to the location where the required speed will change. A time to reach the location where the required speed will change is then determined based on the equation T=L/V_host. Up to this point, the algorithm is quite similar to the algorithm presented in FIG. 10. However, in this embodiment, the algorithm also includes a determination section that determines whether the vehicle is approaching a caution zone. Although not presented in FIG. 15, if a determination was made that the vehicle was not approaching a caution zone, the vehicle could be decelerated or accelerated according to the algorithm of FIG. 10. However, in the event that the vehicle is determined to be approaching a caution zone, the system determines whether V_set is greater than or less than V_set_new, where V_set_new may be determined as previously explained. If V_set is greater than V_set_new, the system may then determine the type of caution zone that it is approaching and/or the status of that caution zone. In the algorithm of FIG. 15, a determination is made as to whether the vehicle is approaching a red traffic light in the event that the caution zone is an intersection with a traffic light. If the system determines that the traffic light of the caution zone has been red, Δt is determined based on a predetermined system deceleration value for vehicle approach to a red traffic light (Δt_systm). In this embodiment of the present invention, Δt_systm is a value fixed by deceleration or acceleration. In the case of ACC, it is the same as coasting deceleration without a target vehicle. According to the algorithm of FIG. 15, if the time T equals the time Δt (where Δt is equal to Δt_systm in the event that the traffic light at the intersection has been red), the set speed of the vehicle is changed. If the time T and the time Δt are substantially equal to each other, the system automatically directs the vehicle speed controller to reduce the vehicle speed to the new set vehicle speed. In the algorithm presented in FIG. 15, the set speed is gradually reduced according to the equation V_set=V_set(initial)+(αd_Vset*t), where αd_Vset is an acceleration rate value that may vary or may be constant over a time between a time t=0 and a time t=Δt, and where V_set(initial) is the speed of the vehicle prior to beginning to decelerate or accelerate. (Note this equation is partially derived from v(t)=v(0)+∫αdt=V(0)+αt, where v(t)=v_set_new and v(0)=v_set.) Thus, in an exemplary embodiment utilizing the just mentioned equation, a timer determines the elapsed time "t" from the beginning of a deceleration or acceleration period, and, based on the elapsed time "t," V_set may be determined. By way of example, if a vehicle initial speed prior to beginning to decelerate or accelerate is 40 miles per hour (58.7 fps), αd_Vset=−5 feet per second per second, and "t"=3 seconds, V_set will be 30 miles per hour (43.6 fps).

Once V_set begins to decrease, it will eventually reach a value about equal to V_set_new, at which time the loop will be broken and the current vehicle speed will be set to the new set speed (V_set_new). Concurrently with the change in V_set, the host vehicle speed should change accordingly. Thus, the host vehicle speed will equal V_set as it changes from V_set to V_set_new. Still further, of course, V_set_new will equal V_host when V_set equals V_set_new.

In the algorithm presented in FIG. 15, if the system determines that the vehicle is not approaching a traffic light that has been red, the system will determine the distance Lf from the point where V_req changes for the low speed zone. Once Lf is determined, the system will then determine a value for a time Δt based on a predetermined relationship, as exemplary depicted in FIG. 12, for the relationship between Δt and Lf. After determining Δtd from the predetermined relationship (this predetermined relationship may be stored in a look up table and/or communicated to the vehicle by an infrastructure communication device, etc.) a value for a deceleration rate αd_Vset may be obtained, which is indicative of a value obtained by subtracting the value of the new set vehicle speed V_set_new from the current vehicle speed V_host and dividing that resulting value by the time Δt. When T=Δt, the set speed is changed according to the equation V_set=V_set(initial)+(αd_Vset*t). The set speed is decreasing changed until T=Δt, at which point V_set=V_set_new.

In the event that V_set is less than V_set_new (i.e., the vehicle is to accelerate to reach the new set speed), a distance Lr from the caution zone to the location where V_req changes to a higher speed zone (V_req2 to V_req3) is determined. For a determined value of Lr, a value for Δt may be determined utilizing, for example, the data presented in FIG. 12 for Δta (Δt to accelerate). The algorithm proceeds in a manner similar to the deceleration regime except that the determined deceleration rate is now an acceleration rate.

It is noted that some of the embodiments of the present invention may not include an algorithm portion that determines the type or condition of a caution zone (e.g., may not determine whether a traffic light is red). That is, if it is determined that V_set is greater than V_set_new, the system may then proceed to determine the distance Lf regardless of the type of caution zone towards which the vehicle is heading.

Figure 16:
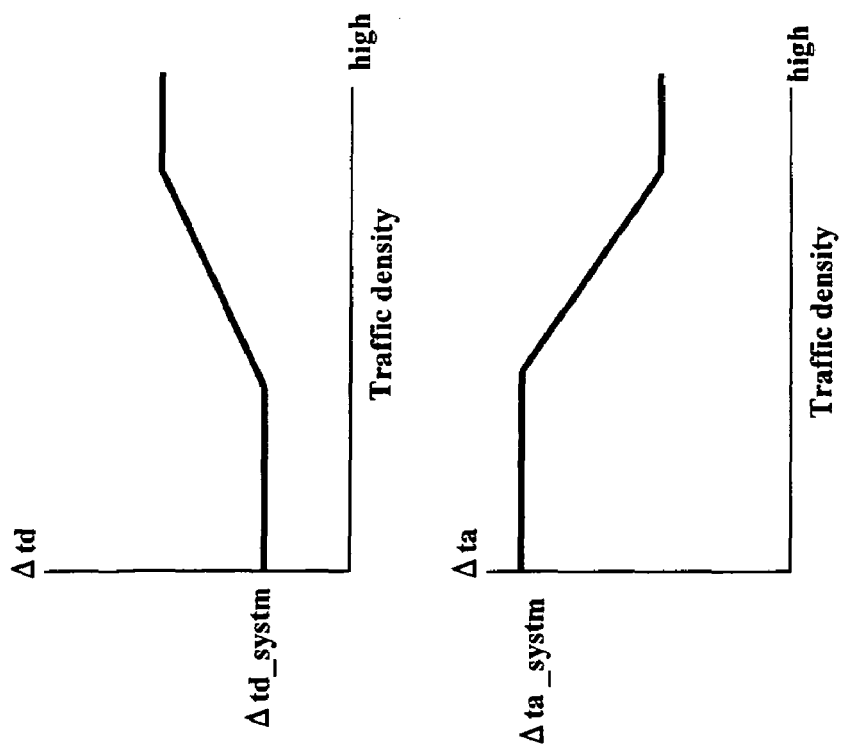
FIG. 16 presents a change in $\Delta t$ as related to traffic density according to an embodiment of the present invention.

Another embodiment of the present invention relates to the determination of the time, Δt, used to change the vehicle speed to the new set speed based on traffic density. That is, Δtd and Δta may be determined in response to variations in traffic density. On roads with high traffic density, values of Δtd might be larger than the value of Δtd_systm to reduce the opportunity that a vehicle behind approaches closer than usual and/or in order to reduce congestion caused by "shockwaves" created by vehicles rapidly decelerating. The variable Δta might be smaller than Δta_systm in high density traffic in order to reduce the deterioration of traffic flow. On roads with low traffic density, Δtd and/or Δta might be equalized to Δtd_systm and ΔΔta_systm respectively. Values for Δtd and/or Δta may change in response to varying traffic density, as may be seen on the exemplary graphs of FIG. 16. The values of Δtd and/or Δta might be determined through empirical testing and/or through computational modeling, or any other appropriate means. Of course, in other embodiments of the present invention, Δtd and/or Δta may vary in a manner different as that shown in FIG. 16. For example, instead of a linearly changing Δta and/or Δtd, an exponentially changing Δtd and/or Δta might be utilized as related to traffic density. Such different regimes may be appropriate for different roadways.

Figure 17:
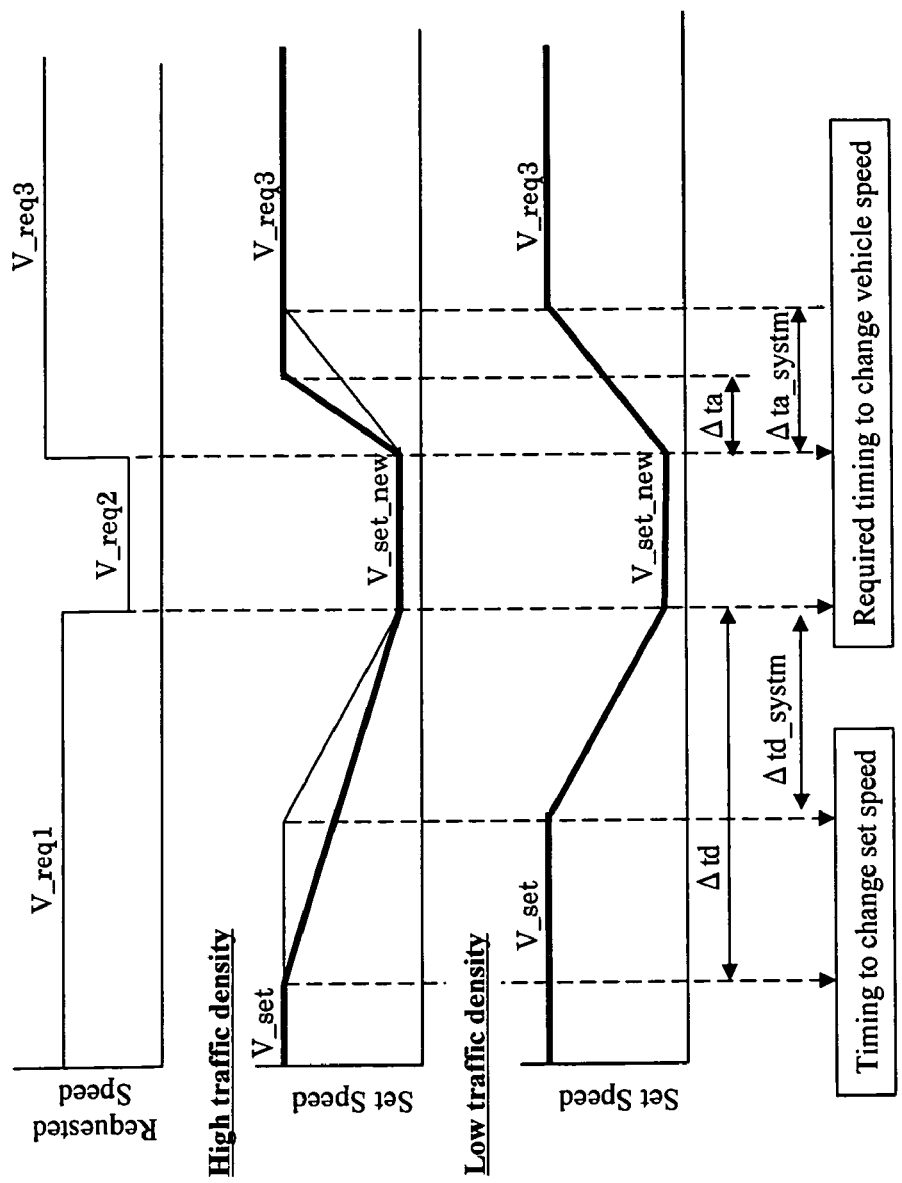
FIG. 17 presents a graphical representation of how host vehicle speed may vary based on a traffic density according to an embodiment of the present invention.

The values of Δtd and/or Δta may be stored in a lookup table onboard the vehicles. Values for traffic density to determine Δta and/or Δtd may be communicated to the vehicle via an infrastructure communication device and/or may be communicated by other vehicles to the host vehicle. Still further, in other embodiments, the vehicle itself may have the ability to estimate traffic density utilizing sensors on the vehicle. Thus, any appropriate method, system or apparatus that may be used to determine traffic density may be used to practice the present invention. FIG. 17 presents a schematic representation of how Δtd and Δta vary for increasing traffic densities. As previously discussed, Δtd_systm and Δta_systm are fixed by the system's deceleration and the acceleration.

Figure 18:
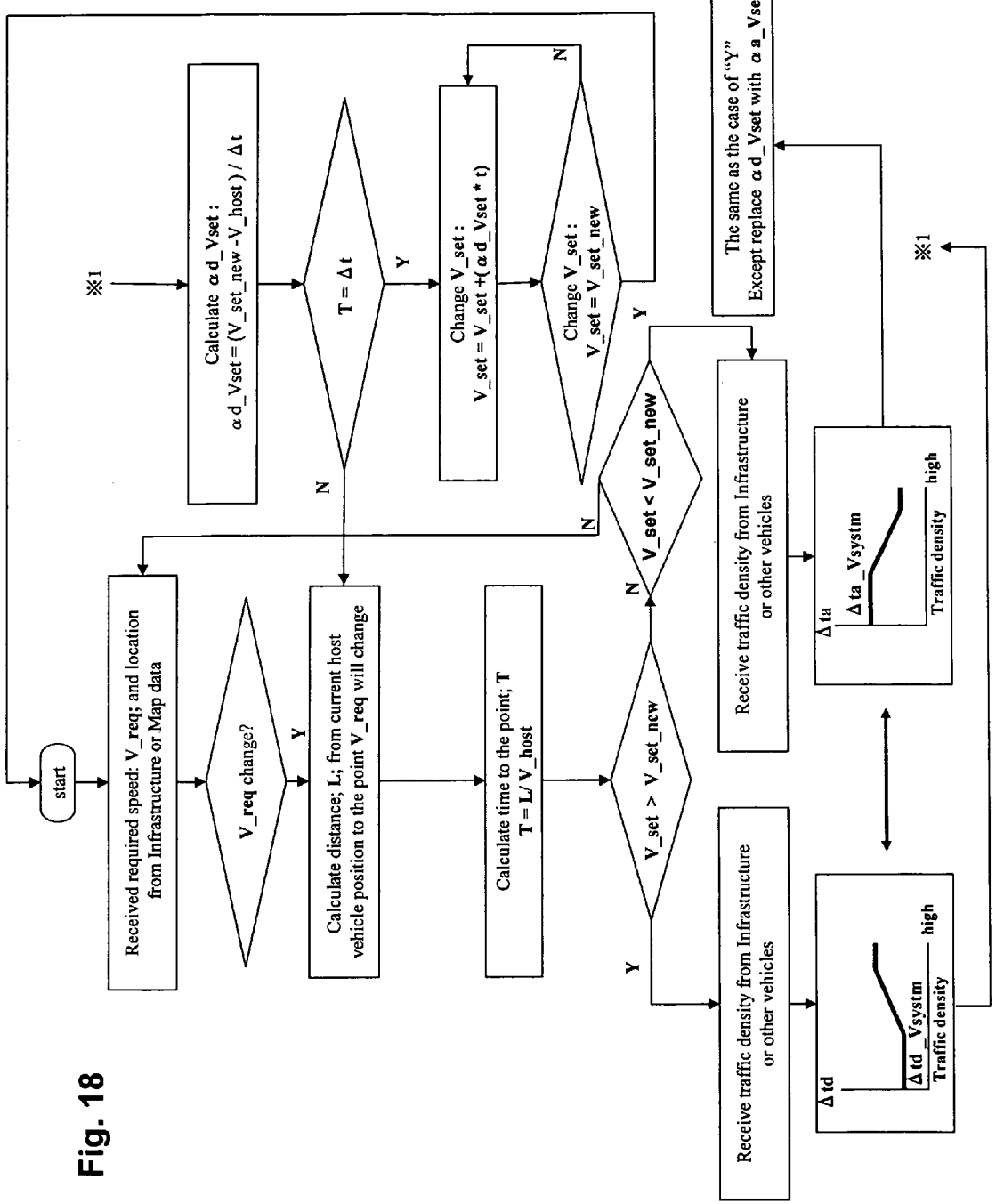
FIG. 18 presents an exemplary algorithm for changing set speed based on varying values of $\Delta t$ as related to traffic density.

FIG. 18 presents an exemplary algorithm for implementing an embodiment of the present invention where traffic density is utilized to determine Δt. It will be noted that many of the sections of the algorithm are similar to those presented in FIG. 15, and thus further explanation will not be provided. As may be seen, if V_set is greater than V_set_new, a value for Δtd will be obtained based on traffic density utilizing the chart for Δtd, as shown. In the event that V_set is less than V_set_new, Δta for acceleration will be obtained based on a traffic density utilizing the chart for Δta. In this algorithm, the system may receive information relating to traffic density from infrastructure and/or other vehicles. Utilizing the value for Δtd or Δta as Δt, a deceleration and/or acceleration rate, respectively, will be determined, from which V_set will be changed to change the set vehicle speed to the new set vehicle speed.

Figure 19:
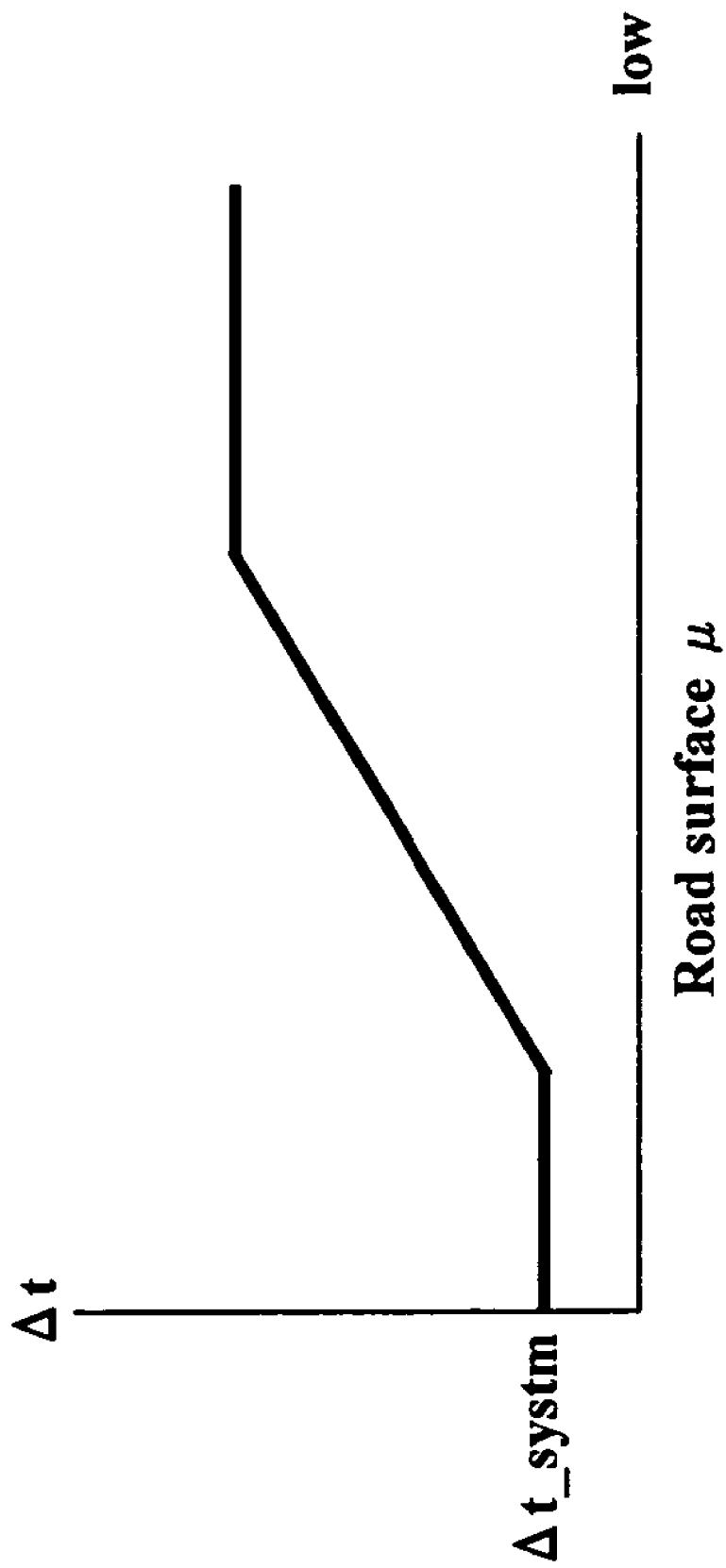
FIG. 19 presents a change in $\Delta t$ as related to road surface coefficient of friction according to an embodiment of the present invention.

Another embodiment of the present invention relates to varying the time to decelerate and/or accelerate a vehicle based on the surface condition of a roadway. For example, in the case of bad weather, such as rain and/or snow, that would create a situation where the road surface is more slippery than a dry surface, Δt might be larger than standard Δt_systm in order to further increase vehicle control. In such an embodiment, Δt might be changed in response to road surface conditions, such as the coefficient of friction of a road surface μ. FIG. 19 presents an exemplary graph of how Δt might change for varying road surface coefficients of friction. The road surface coefficient of friction could be determined, such as by way of example, with an estimating system on the host vehicle, and/or can be communicated to the host vehicle via an infrastructure communication device and/or via other vehicles.

The regime presented in FIG. 19 depicting a variation in Δt with decreasing road surface coefficient of friction may be developed through empirical and/or computational testing. As with the other regimes for Δt, other embodiments of the present invention may utilize a regime where Δt varies in a manner differently than that depicted in FIG. 19.

Figure 20:
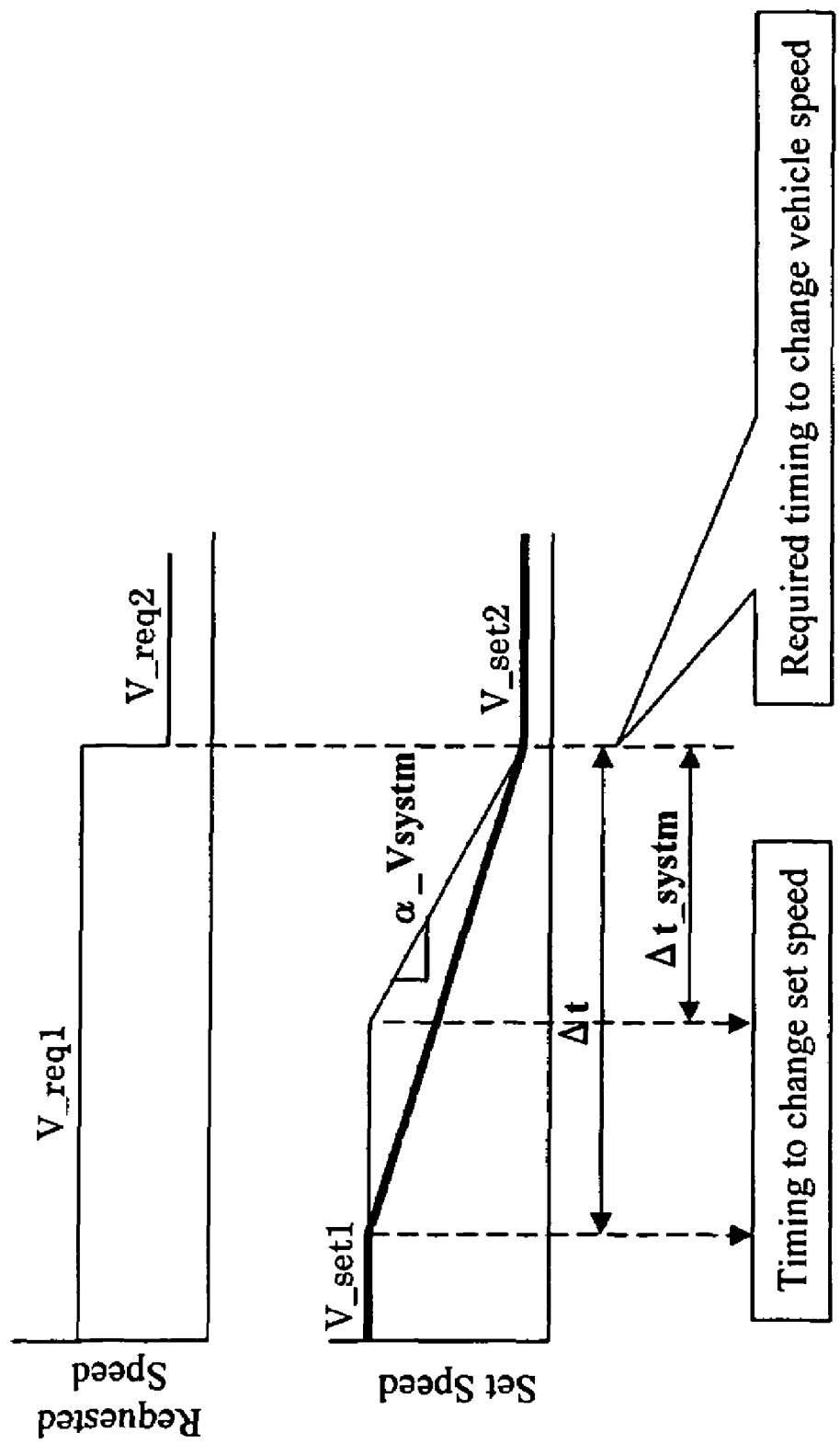
FIG. 20 presents a graphical representation of how host vehicle speed varies based on road surface conditions according to an embodiment of the present invention.

FIG. 20 presents a schematic that utilizes two different values of Δt for two different road surface conditions, where Δt_systm is again fixed by system deceleration or acceleration. In the case of ACC, Δt_systm is the same as coasting deceleration/acceleration without a target vehicle.

Figure 21:
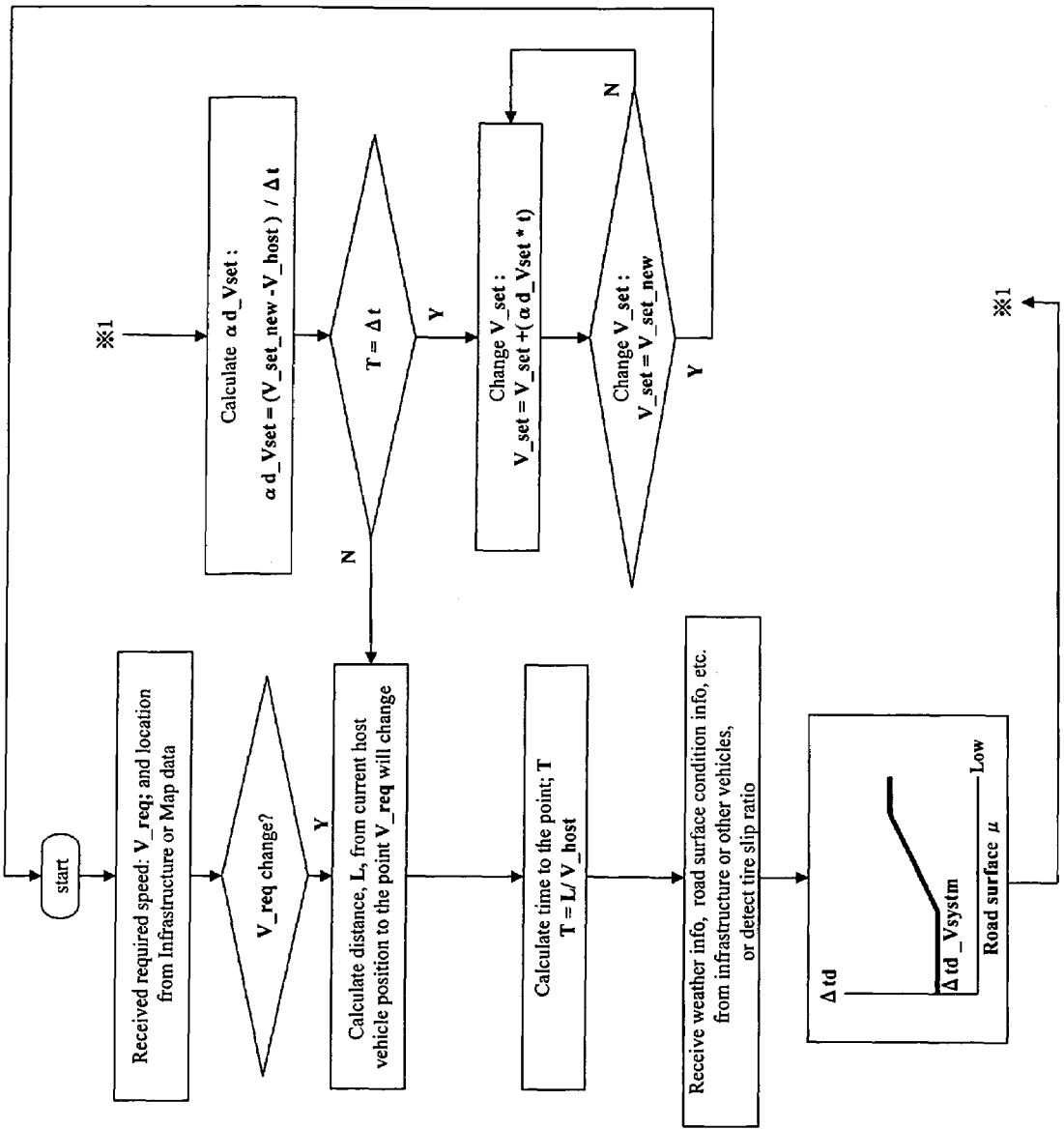
FIG. 21 presents an exemplary algorithm for changing set speed based on varying values of $\Delta t$ as related to road surface conditions.

FIG. 21 presents an exemplary algorithm for implementing this embodiment of the invention.

Figure 22:
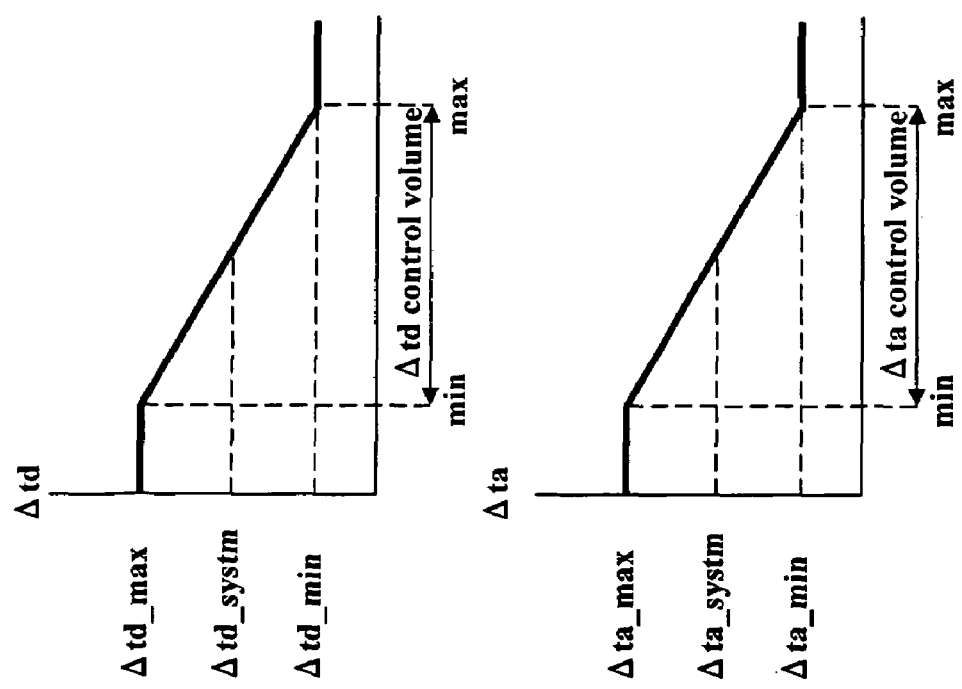
FIG. 22 presents a change in $\Delta t$ as related to a driver's desired deceleration/acceleration rates according to an embodiment of the present invention.

Yet another embodiment of the present invention relates to varying Δt to change the vehicle speed from a set speed to a new set speed based on a driver's choice of deceleration and/or acceleration regimes. In an exemplary embodiment, a vehicle with a cooperative speed control system may be equipped with a device that enables a driver to input a desired deceleration rate and/or a desired acceleration rate into the system. By way of example, the device might be a rheostat mounted on the dashboard of the vehicle, where the driver adjusts the rheostat in a manner similar to adjusting a rheostat for a volume control of a radio. By increasing the "volume" of the driver's input through the rheostat, the time Δt to accelerate and decelerate would be reduced. FIG. 22 shows an exemplary regime for varying Δtd based on the variation in acceleration control volume. As may be seen from the regimes presented on FIG. 22, the nominal value for the range of Δtd and Δta is centered around Δtd_systm and Δta_systm, respectively, where Δtd_systm and Δta_systm are fixed by system deceleration or acceleration. In the case of ACC, Δta_systm and Δtd_systm is the same as coasting deceleration without a target vehicle. However, other regimes may be appropriate.

Figure 23:
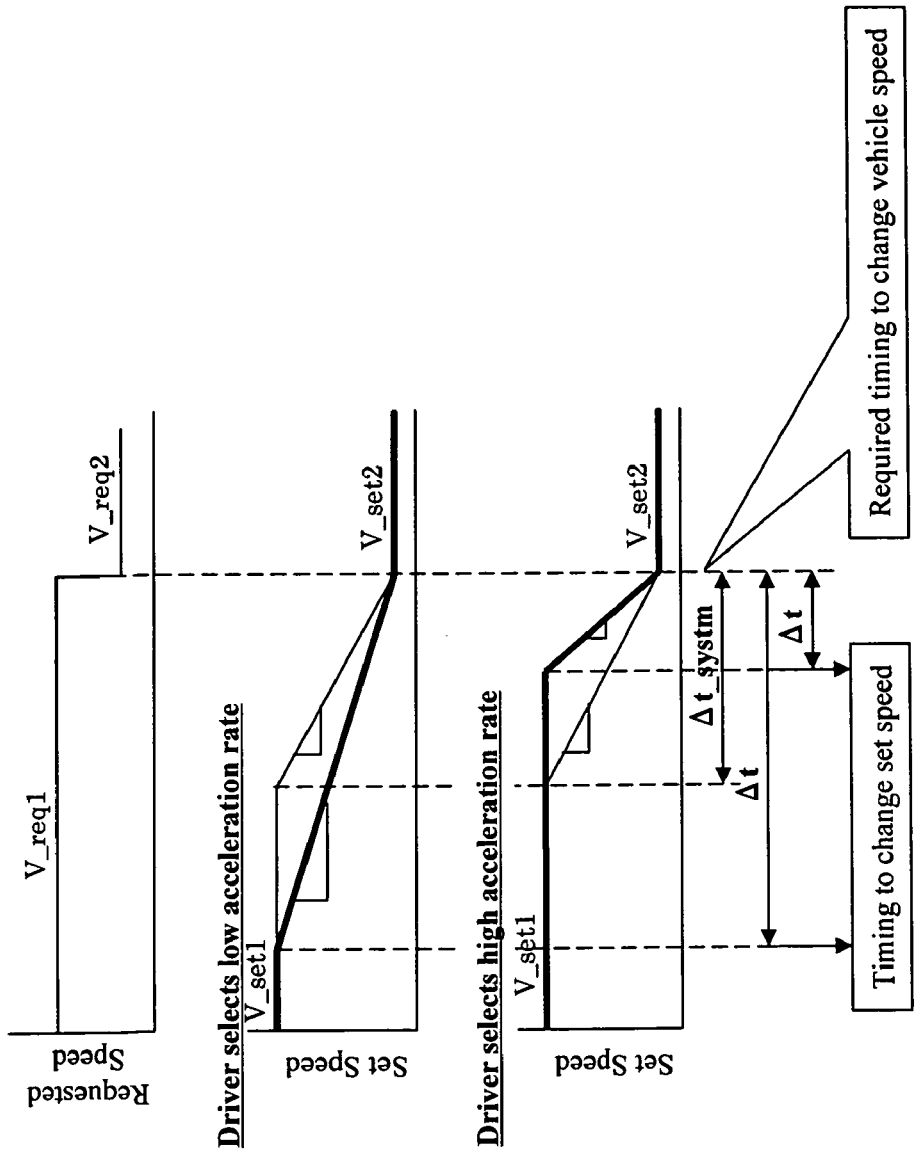
FIG. 23 presents a graphical representation of how host vehicle speed varies based on changing driver's desired deceleration/acceleration rates according to an embodiment of the present invention.
Figure 24:
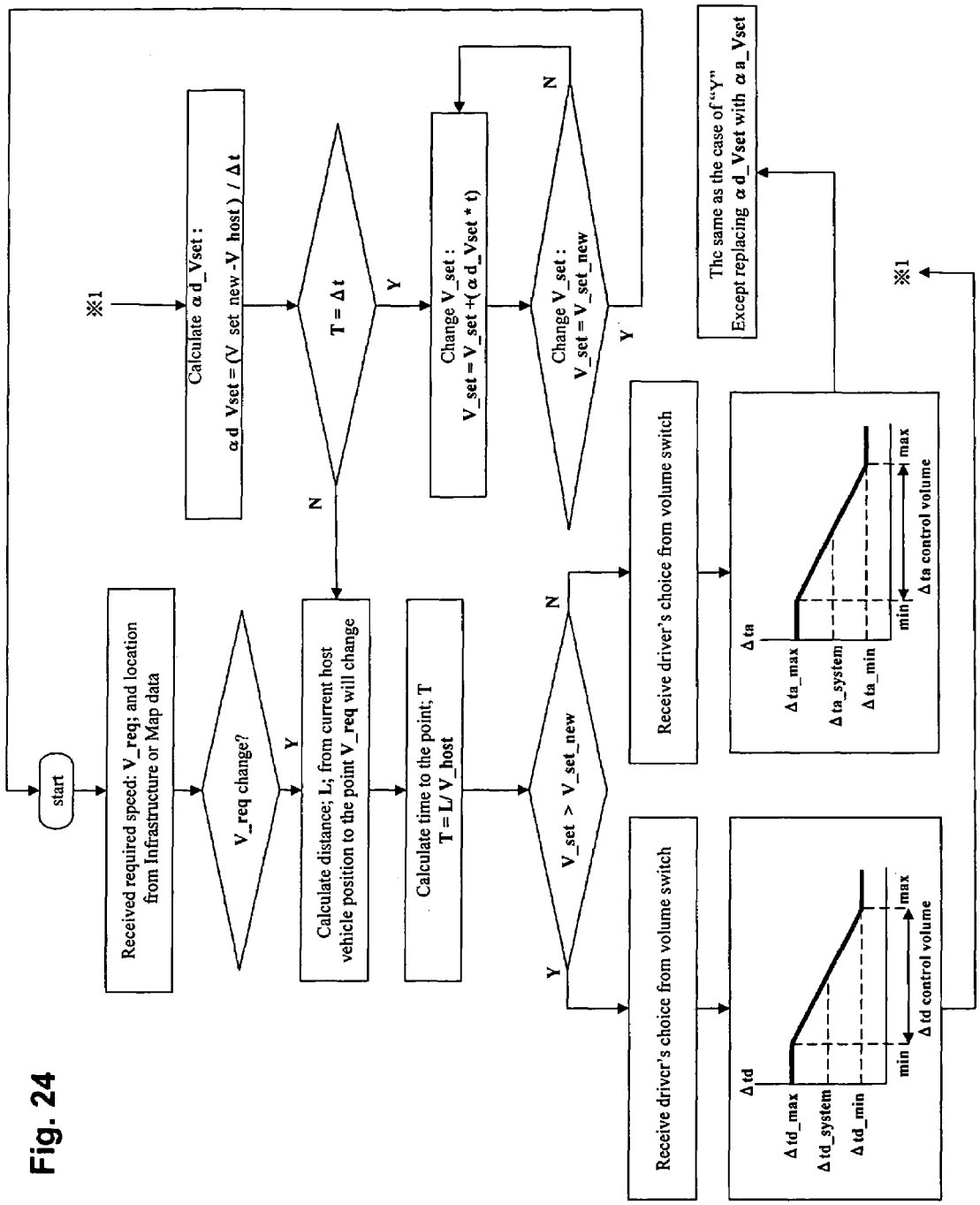
FIG. 24 presents an exemplary algorithm for changing set speed based on varying values of driver desired deceleration/acceleration rates.

FIG. 23 presents a graphical illustration that shows the difference between deceleration times for a driver selected low acceleration rate and a driver selected high acceleration rate. FIG. 24 presents an exemplary algorithm for implementing this embodiment of the invention.

In some embodiments of the present invention, as noted above a vehicle rheostat may be used to input the driver's choice in acceleration and deceleration times into the adaptive speed control system. However, other embodiments in the invention may utilize other systems, such as a pressure sensor and/or even perhaps a voice recognition system. Thus, any method apparatus or system that may be used to input a driver's choice for acceleration and deceleration rates into the system may be utilized with embodiments of the present invention.

In another embodiment of the present invention, there is a cooperative speed control system that learns and memorizes usual driver's set speeds at various locations on a roadway. That is, the system records or otherwise remembers the various set speeds and links the speeds to respective geographical locations. When the driver again drives on this given roadway, the system "remembers" the previously set vehicle speeds and controls the vehicle to again travel at these set speeds. In an exemplary scenario in a vehicle that travels south on "Highway 1" for the first time, the system periodically detects its position by GPS and also detects the current set vehicle speed at that position. The system stores in a database the information received from the GPS system as well as the information related to the set vehicle speed and links the information.

When the driver next drives down "Highway 1," the cooperative speed control system again detects the host vehicle's location based on received GPS signals and compares the location to the location stored in the database. The system correlates the present location, based on the GPS system data, to that stored in the database and identifies the previously set vehicle speed. The system then outputs a signal to control the vehicle such that it will travel at the velocity substantially equal to the previously set vehicle speed.

Figure 25:
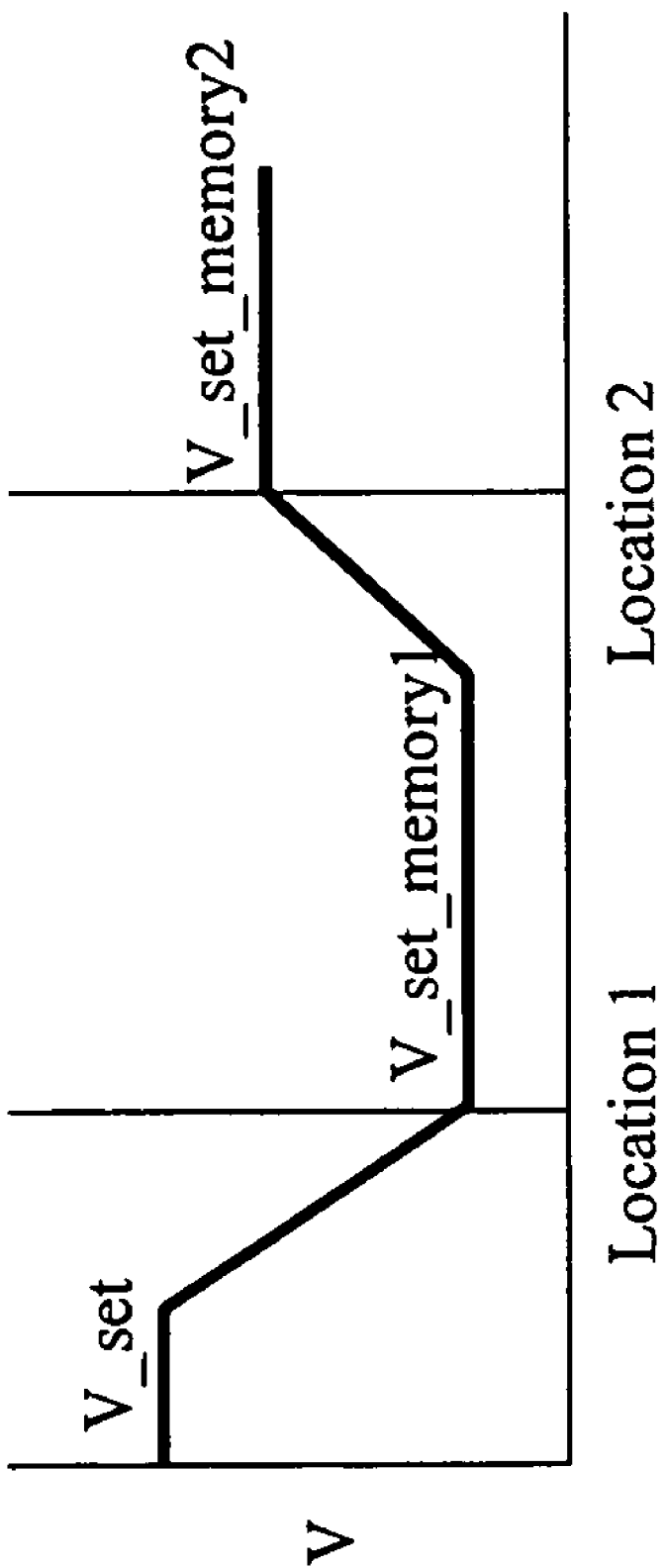
FIG. 25 presents a graphical representation of vehicle velocity (V) versus location according to another embodiment of the present invention, where the set velocity of the host vehicle is changed based on a change of location of the host vehicle.
Figure 26:
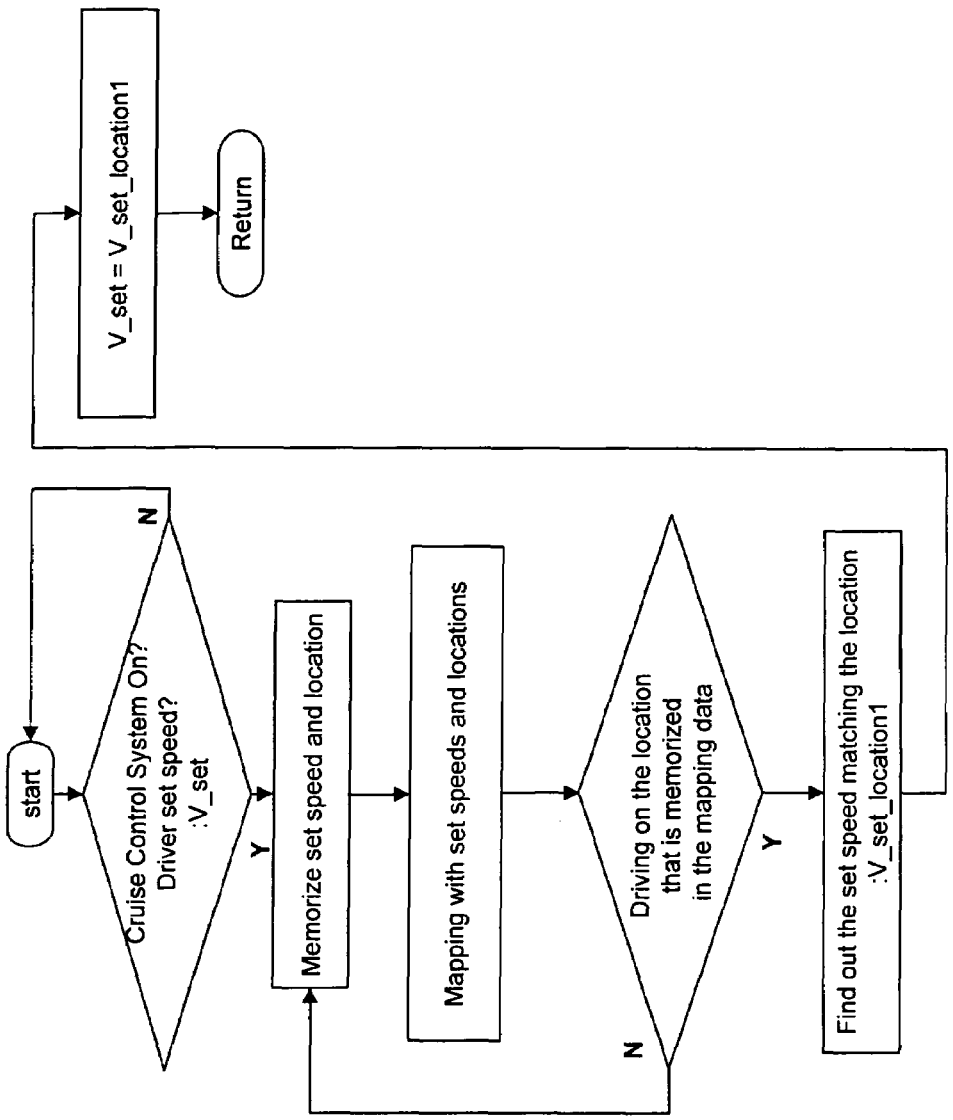
FIG. 26 presents an exemplary algorithm for changing vehicle velocity (V) versus geographical location and for learning how to change vehicle velocity (V) versus geographical location.

FIG. 25 presents a schematic representation of changes in set speed based on location. In other embodiments of the present invention, the system may average different set speeds over a plurality of uses of the same road. For example, if the host vehicle has driven down "Highway 1" five times, and four of the five times the driver sets the vehicle speed of 60 miles per hour and then one other time the driver sets the vehicle speed at 50 miles per hour, the system may average the various set speeds, but weight it towards the more frequently driven speed (i.e., the average set vehicle speed will be closer to 60 mph than 50 mph). FIG. 26 presents an exemplary algorithm for implementing this embodiment of the invention.

Some embodiments of the present invention include a processor adapted to receive at least a first signal indicative of a first local required speed, a second signal indicative of a second local required speed received after the first signal, and a third signal indicative of a value of a current vehicle speed; wherein the processor includes logic to automatically determine a new set vehicle speed based at least on the first local required speed, the second local required speed, and the current vehicle speed, and automatically initiate output of a signal to a vehicle speed controller to change vehicle speed to a new set vehicle speed. In some embodiments, the logic allows for a determination of a new set vehicle speed by automatically identifying a vehicle acceleration rate value based on a current vehicle component status. In other embodiments, the processor further includes logic to automatically determine a value for a distance L, automatically determine a value for a time T, automatically determine a value for a time Δt. The processor may further include logic to initiate output of a signal to the vehicle speed controller to change the vehicle speed to the new set vehicle speed if the value of the times T and Δt are substantially equal to each other.

In some embodiments of the present invention, the processor may be adapted to receive information that will enable the processor to determine whether the vehicle is approaching a caution zone and to receive information related to at least one of (i) a type of caution zone that the vehicle is approaching and (ii) a condition of the caution zone that the vehicle is approaching. A processor according to embodiments of the present invention may also automatically determine whether the current vehicle speed is greater than and/or less than the new set vehicle speed, automatically determine a value for a time Δt based on predetermined values of Δt, etc. Thus, the invention includes a processor that is adapted to and/or includes logic to implement some or all of the various embodiments of the present invention.

Some embodiments of the present invention may utilize a processor that receives a plurality of signals indicative of respective set vehicle speeds and a plurality of signals respective of geographical positions of the vehicle. That is, for example, the processor may receive a signal indicative of a set speed when the vehicle is at, for example, a geographical position related to a particular mile marker on a highway. By way of example, the processor may receive a signal indicative of a set vehicle speed when the vehicle is in proximity to a particular mile marker on a highway as well as receive a signal indicative of its geographical position (i.e. the geographical position related to the particular mile marker). The signal indicative of set vehicle speed and the signal indicative of geographical position may come in close temporal proximity to one another such that these signals may be correlated to or otherwise linked to respective set vehicle speeds and geographical positions and stored in a memory. Using a memory so configured, a cooperative speed control device may "remember" the set vehicle speeds relative to various locations on a highway. Thus, the device may learn how a driver varies his or her set vehicle speeds based on geographical location and thus control the vehicle speed accordingly. In an exemplary embodiment, the processor may receive a signal indicative of the current geographical position of the vehicle and then retrieve from the memory the respective stored set vehicle speed for this particular location and then output a signal to the vehicle speed controller to set the vehicle speed based on the speed that is linked to the geographic position. In some embodiments of the present invention, a GPS may be used to obtain the signal indicative of the current geographic position of the vehicle. Still further by way of example, radio beacons may be used that indicate a location. In other embodiments of the present invention, advanced image recognition software may be used to recognize location.

It is noted that in determining values for the distances between current vehicle positions and required speed change locations and caution zones, etc., a GPS may be used. Alternatively or in addition to this, a sensor onboard the vehicle, such as laser radar, may be used. Still further, the distances may be communicated to the vehicle from infrastructure communication devices and/or from other vehicles, etc. Thus, any method, system or apparatus that will convey data to a vehicle to implement the embodiments of the present invention may be used.

Slope of Change of Speed

Another embodiment of the present invention relates to the determination of the "slope," or vehicle acceleration rate value, $\alpha\_Vset$, to decelerate or accelerate the host vehicle from a current speed to a new set speed utilizing the cooperative speed control system where the set speed is reduced according to the "slope" to obtain the new set speed and the use of the determined value of the slope, to change the current vehicle speed to the new set vehicle speed. By "slope," it is meant the rate at which the vehicle reduces speed or increases speed. For example, if a vehicle reduces speed 10 mph every second for 10 seconds until the set speed is reached, the slope is 10 mph/second (14.667 ft per second per second.)

Before describing the particulars of this embodiment, an exemplary scenario utilizing an embodiment will first be described, starting with an explanation of the conditions that may benefit from such an embodiment. It is noted that the following explanation is somewhat abbreviated where similarities exist with the above-described scenarios.

Speed limits on a roadway periodically change from one speed limit to another, and typically drivers desire that any reduction in speed of their vehicle owing to a change of speed limits be completed by about the time the driver passes the sign indicating the reduced speed.

In an embodiment that utilizes a reduction in the set speed to reduce the speed of the vehicle, reduction in speed will occur according to a vehicle acceleration rate value (which in the case of deceleration, is negative), hereinafter identified as $\alpha\_Vset$, which may be construed as the slope of the rate of change of speed of the vehicle. Thus, an embodiment of the present invention relates to the determination of slope $\alpha\_Vset$ to change a vehicle speed from a current vehicle speed to a new set speed so that the new set speed will be obtained by the time the vehicle reaches the location where the required speed changes. Therefore, an embodiment of the present invention relates to determining the rate of change in speed which it takes to reduce speed from a current set speed to a new set speed, as will now be further specifically detailed.

According to one embodiment, there is a cooperative speed control system that changes the actual vehicle speed to the new set vehicle speed by changing the set speed according to the slope, $\alpha\_Vset$, where the slope $\alpha\_Vset$ is selected to be the same as the constant value for $\alpha\_Vsystm$, the constant vehicle acceleration rate value that is fixed by system deceleration or acceleration, as detailed above.

Figure 27:
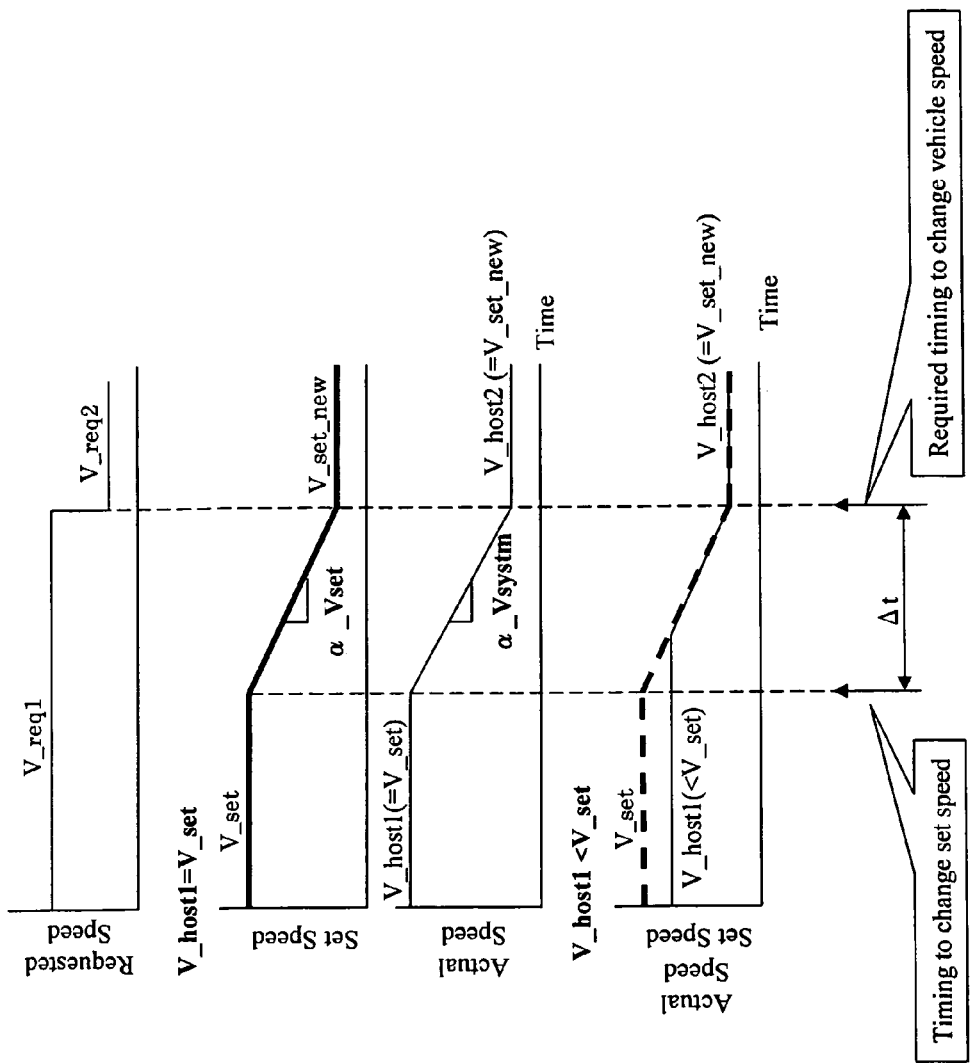
FIG. 27 presents a graphical representation of how time $\Delta t$ varies with host vehicle speed.

FIG. 27 graphically illustrates how Δt varies for different vehicle speeds for a $\alpha\_Vset$ that is the same as $\alpha\_Vsystm$. In one graph on FIG. 27, the current speed of the host vehicle, V_host1, is equal to the set speed, while in another graph of FIG. 27, the current speed of the host vehicle, V_host1, is less than the set speed. As may be readily seen, the time Δt that is required for the vehicle to decelerate from the current speed (V_host1/V_set, etc.) to the new set speed, when $\alpha\_Vset$ is the same as $\alpha\_Vsystm$ (or $\alpha\_Vset$ is the same in both instances), varies depending on the current speed of the host vehicle. From FIG. 27, it may be readily seen that the time at which the vehicle begins to decelerate is delayed for lower current speeds when $\alpha\_Vset$ is the same as $\alpha\_Vsystm$ (or otherwise the same in both instances).

In FIG. 27, the vehicle acceleration rate, $\alpha\_Vset$, which is the same as $\alpha\_Vsystm$, is a negative value (as noted above, acceleration rates may be both positive for positive acceleration and negative for negative acceleration) owing to deceleration of the vehicle. In this embodiment, $\alpha\_Vsystm$ is a constant vehicle acceleration rate value that is fixed by system deceleration or acceleration. In this embodiment, the vehicle acceleration rate value $\alpha\_Vsystm$ is fixed based on a current vehicle component status. By way of example only and not by way of limitation, $\alpha\_Vsystm$ may be fixed based on the engine rpm, the coefficient of friction of the tire wheels, and/or transmission gear position, etc. In yet other embodiments, $\alpha\_Vsystm$ may be impacted by torque and/or power characteristics of the engine, vehicle shape that might impact air resistance, electrical load and/or air condition compressor activation that might impact engine RPM, and/or friction between brake pads and rotors (and/or brake drums and shoes), etc. In the case of ACC, $\alpha\_Vsystm$ is the same for deceleration as coasting deceleration without a target vehicle. As in the embodiment for "Timing to Change Speed," presented above, vehicle acceleration rate is treated as an effective constant in determining $\Delta t$.

Figure 28:
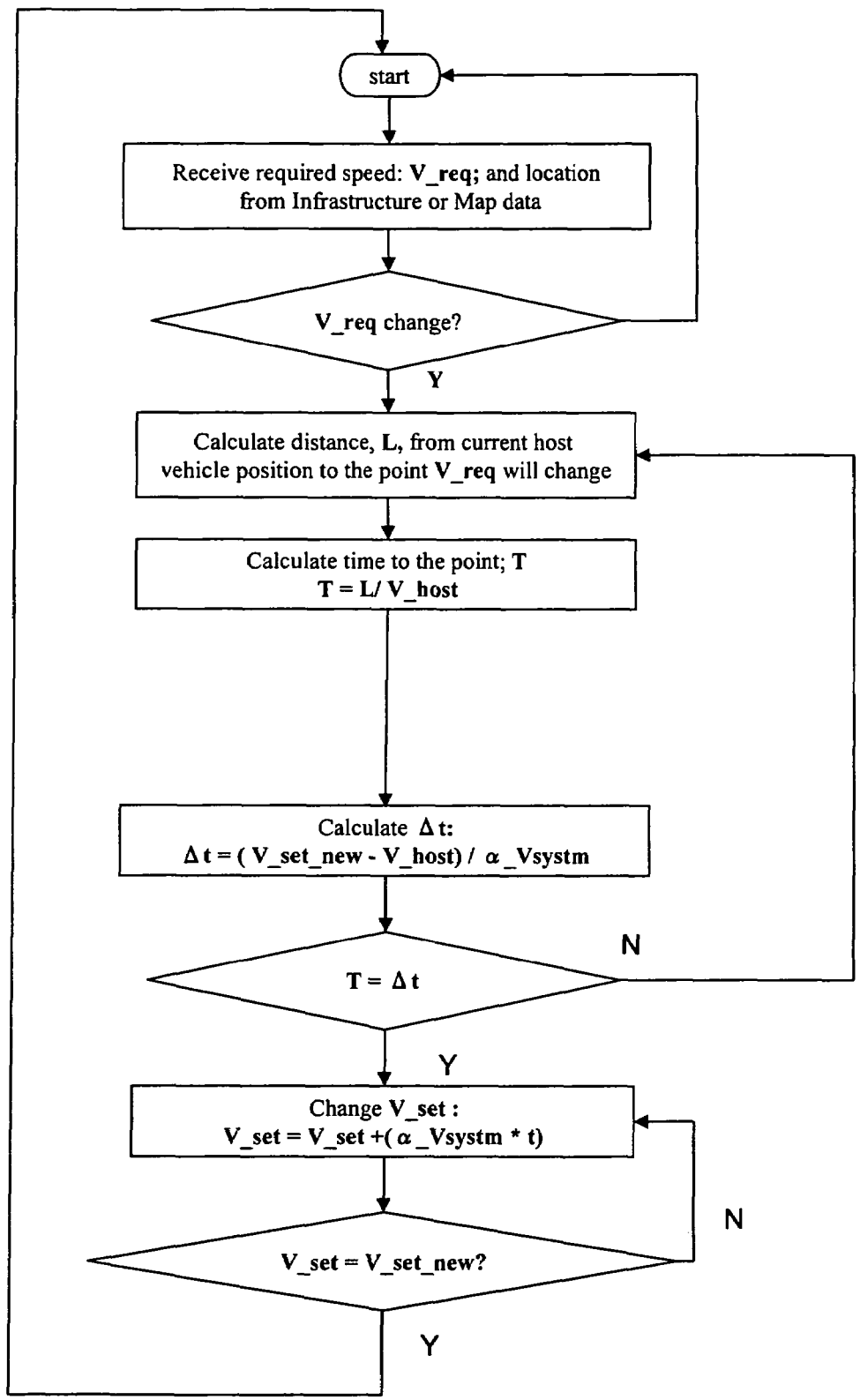
FIG. 28 presents an exemplary algorithm for changing set speed based on $\alpha\_Vset$.

FIG. 28 presents an exemplary algorithm for changing set speed in accordance with $\alpha\_Vset$ that is the same as $\alpha\_Vsystm$. As in the algorithm of FIG. 10, in the algorithm of FIG. 28, when the cooperative speed control system determines that a required speed has changed from a first required speed to a second required speed, the time to the location at which the required speed will change to the second required speed based on the current speed of the host vehicle is calculated utilizing equation (5). Also as in the algorithm of FIG. 10, $\Delta t$ may be obtained based on equation (6). Again, V_set_new, may be determined utilizing one or more of the embodiments described herein.

According to the exemplary algorithm of FIG. 28, T may be calculated a number of times until convergence with $\Delta t$ is obtained. Once convergence is obtained, the speed of the vehicle is changed by a vehicle speed controller so that the host vehicle speed becomes the new set vehicle speed. The cooperative speed control system according to this embodiment may initiate a control regime where the speed of the host vehicle is gradually reduced based on the vehicle acceleration rate value $\alpha\_Vsystm$ until the speed of the host vehicle equals the new set vehicle speed (as may be readily seen from FIG. 28). In the algorithm of FIG. 28, a loop is presented for obtaining a gradual reduction in speed utilizing the equation $$V\_set = V\_set + (\alpha\_Vsystm * t) \quad (7)$$

where "t" is a time increment obtained by dividing $\Delta t$ by the number of loop runs. For example, if $\Delta t=10$ seconds and the number of loops is 100, $t=0.1$ seconds. Another way of considering this is that the loop is performed for a number of times $\Delta t/t$. The loop of FIG. 28 for gradual reduction in speed is "broken" when $V\_set=V\_set\_new$. Every time the loop is run, Vset is changed according to equation (7), where Vset decreases from the previous Vset by a value of the acceleration rate multiplied by one increment of time t. Alternatively, in a scenario where V_set_new is greater than V_set and $\alpha\_Vsystm$ is positive, the cooperative speed control system may implement a speed control regime such that the vehicle speed is gradually increased, according to equation (7) until V_set_new is reached.

Another embodiment of the present invention relates to a scenario where the acceleration rate value, $\alpha\_Vset$, is varied based on the presence of caution zones associated with the required speed reduction/increase associated with the change in required speed. Again, starting with an exemplary scenario, when traveling towards caution zones such as intersections, traffic lights, crosswalks and/or locations where a driver may anticipate that he or she will bring the vehicle to a complete stop or close to a complete stop, etc., the acceleration rate value, $\alpha\_Vset$, (for deceleration $\alpha\_Vset=\alpha d\_Vset$, for acceleration, $\alpha\_Vset=\alpha a\_Vset$), might be larger than other situations. For larger values of $\alpha\_Vset$, $\Delta t$ would be smaller, and for smaller values of $\alpha\_Vset$, $\Delta t$ would be larger. This is because, for example, drivers often vary their vehicle's deceleration rate based on whether the vehicle is traveling towards an area where extra caution may be needed. Exemplary scenarios where larger/smaller values of $\alpha\_Vset$ are employed are similar to those detailed above in section "Timing to Change Speed" for smaller/larger values of desired $\Delta t$, respectively.

Figure 29:
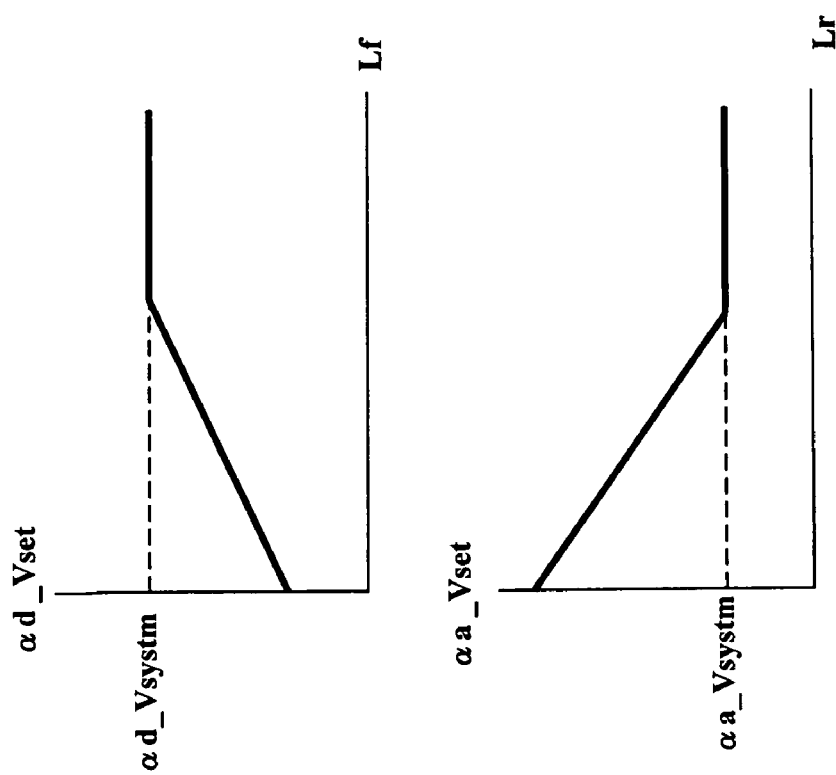
FIG. 29 presents a change in $\alpha\_Vset$ as related to distance from a caution zone according to an embodiment of the present invention.

An embodiment of the present invention utilizes the variances in the values of Lf and Lr (see above and FIG. 11, which schematically illustrates Lf and Lr) and correlates these distances to a rate of decrease in speed, $\alpha d\_Vset$ or to a rate of increase in speed $\alpha a\_Vset$, in reaction to the change in the required speeds, to determine a value for $\alpha\_Vset$ that may be used to change the vehicle speed to the new set vehicle speed. FIG. 29 presents an example of the correlation of $\Delta d\_Vset$ with Lf and the correlation of $\alpha a\_Vset$ with Lr in an exemplary embodiment according to the present invention. The values for $\alpha d\_Vset$ and $\alpha a\_Vset$ may be predetermined and stored in a database onboard the vehicle and/or may be broadcast to the vehicle from an infrastructure communication device. The values $\alpha d\_Vset$ and $\alpha a\_Vset$, as they correlate to Lf and Lr respectively, may be determined through empirical testing and/or through computational techniques. It will be noted that in FIG. 29, $\alpha d\_Vset$ linearly increases with increasing Lf until it reaches a certain value $\alpha d\_Vsystm$, at which point it levels off and is a constant for greater values of Lf. Conversely, $\alpha a\_Vset$ gradually decreases with increasing Lr until a certain value $\alpha a\_Vsystm$, at which point it levels off and remains constant for increasing values of Lr. The variables $\alpha d\_Vsystm$ and $\alpha a\_Vsystm$ are values fixed by the system's deceleration/system's acceleration, etc. In the case of ACC, system deceleration is the same as coasting deceleration without a target vehicle, and system acceleration is the same as acceleration without the target. Such decelerations and accelerations may be fixed so that vehicle occupants do not feel uncomfortable.

Figure 30:
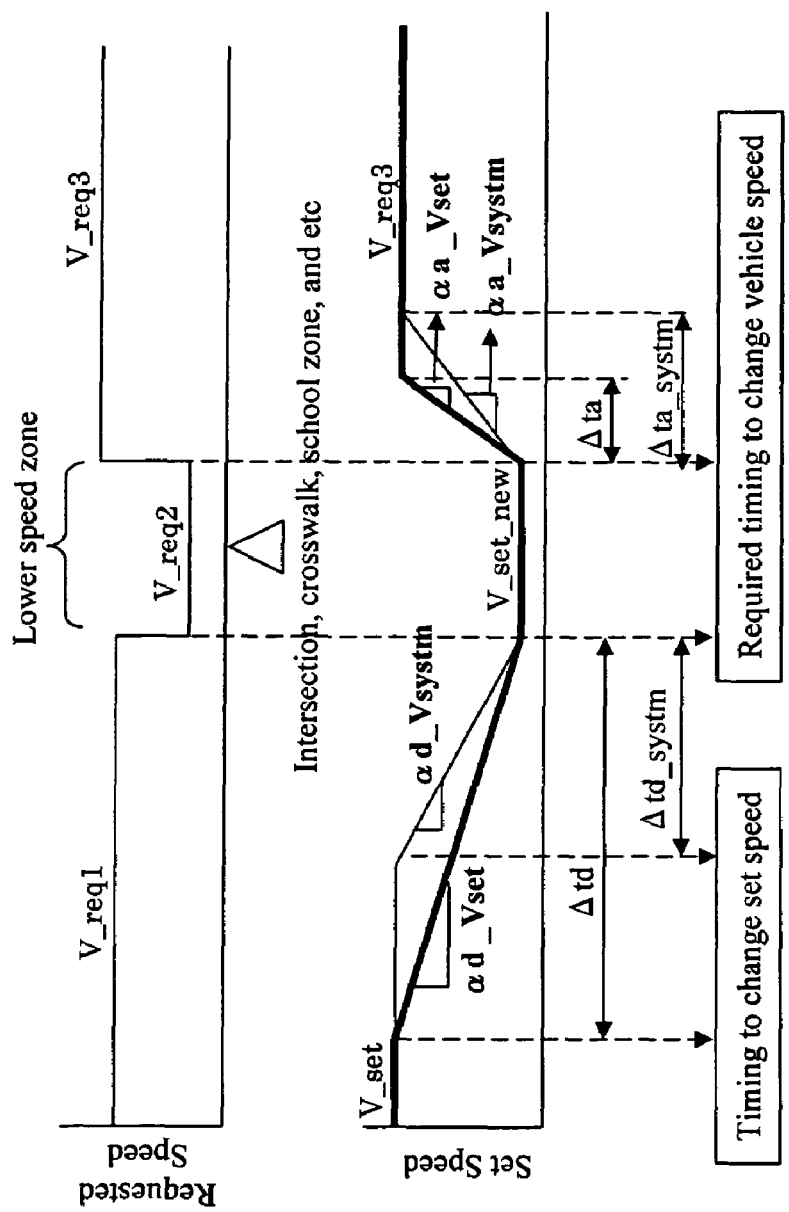
FIG. 30 presents a graphical representation of how $\alpha\_Vset$ varies with varying distances of speed change locations from a caution zone according to an embodiment of the present invention.

FIG. 30 presents a schematic representation of how $\alpha d\_Vset$ and $\alpha a\_Vset$ may vary as compared to respective $\alpha d\_Vsystm$ and $\alpha a\_Vsystm$ values. FIG. 30 portrays a scenario where a lower acceleration rate ($\alpha d\_Vset$) is desired than that which would be provided by $\alpha d\_Vsystm$. Still further, FIG. 30 presents a scenario where a higher acceleration rate $\alpha a\_Vset$ is desired than that which would be provided by $\alpha a\_Vsystm$, such as may be the case to ensure that traffic flows as smoothly as possible to prevent traffic jams associated with the caution zone down road from the caution zone thus reducing the deterioration in traffic flow.

Figure 31:
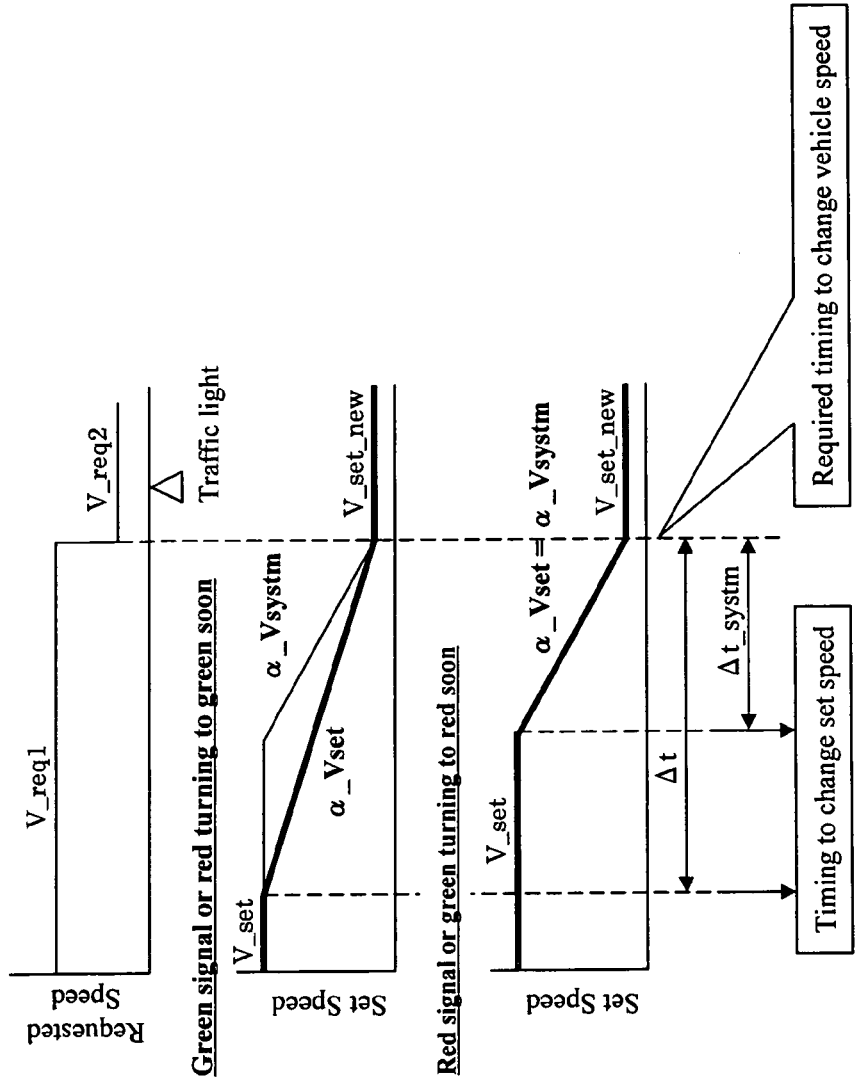
FIG. 31 presents a graphical representation of how host vehicle speed may vary based on a condition of a caution zone according to an embodiment of the present invention.

Some embodiments of the invention further relate to the type of caution zone/the status of the caution zone that the vehicle is approaching. FIG. 31 presents a schematic representation of how the acceleration rate value to change the vehicle speed to the set speed varies for a traffic light at an intersection that is red (i.e., indicating that traffic should stop) as compared to green (indicating that traffic should proceed). In an embodiment, if the host vehicle is approaching a red signal, $\alpha\_Vset$ will equal $\alpha\_Vsystm$.

Figure 32:
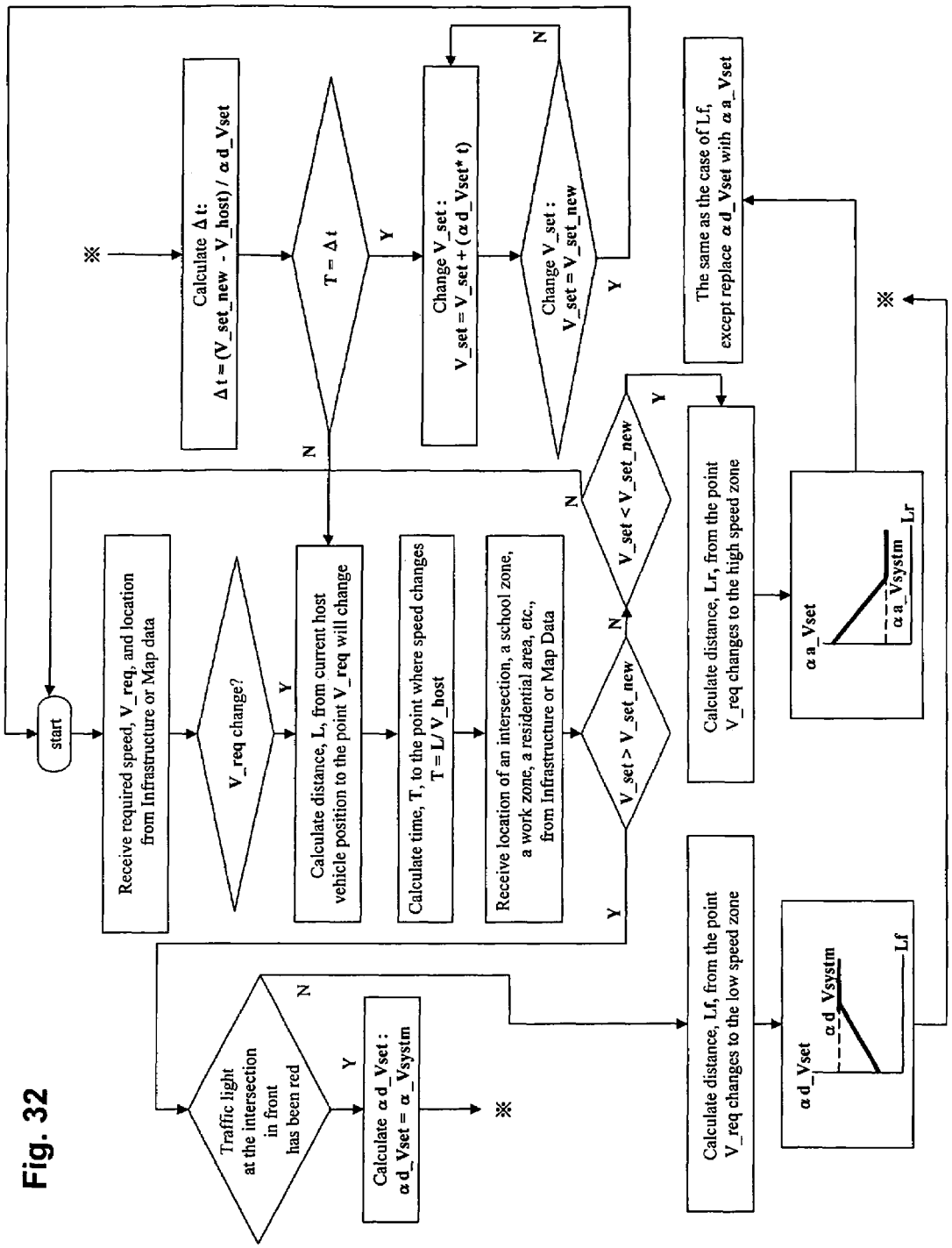
FIG. 32 presents an exemplary algorithm for changing set speed based on varying values of $\alpha\_Vset$.

FIG. 32 presents an algorithm for implementing an embodiment of the present invention relating to variable deceleration and acceleration rate values when approaching caution zones and driving away from caution zones. The algorithm shown on FIG. 32, when implemented in a cooperative speed control system according to the present invention, as with the algorithm of FIG. 15, first determines whether there is a change in required speed. If there is a change in the required speed, the system determines the distance L from the current location of the host vehicle to the location where the required speed will change. A time to reach the location where the required speed will change is then determined based on the equation $T=L/V\_host$. The algorithm also includes a determination section that determines whether the vehicle is approaching a caution zone. Although not presented in FIG. 32, if a determination was made that the vehicle was not approaching a caution zone, the vehicle could be decelerated or accelerated according to the algorithm of FIG. 28. However, in the event that the vehicle is determined to be approaching a caution zone, the system determines whether V_set is greater than or less than V_set_new, where V_set_new may be determined as previously explained. If V_set is greater than V_set_new, the system may then determine the type of caution zone that it is approaching and/or the status of that caution zone. In the algorithm of FIG. 32, a determination is made as to whether the vehicle is approaching a red traffic light in the event that the caution zone is an intersection with a traffic light. If the system determines that the traffic light of the caution zone has been red, $\alpha$_Vset is determined based on the predetermined system deceleration value for vehicle approach to a red traffic light ($\alpha$_Vsystm). In this embodiment of the present invention, $\alpha$_Vsystm is a value fixed by deceleration or acceleration. In the case of ACC, it is the same as coasting deceleration without a target vehicle. According to the algorithm of FIG. 32, if the time T equals the time $\Delta$t, where $\Delta$t is a value indicative of a value obtained by the equation $$\Delta t = (V\_set\_new - V\_host)/\alpha\_Vset \quad (8)$$

where $\alpha$_Vset=$\alpha$d_Vset in the case of deceleration, in the event that the traffic light at the intersection has been red, the set speed of the vehicle is changed. If the time T and the time $\Delta$t are substantially equal to each other, the system automatically directs the vehicle speed controller to reduce the vehicle speed to the new set vehicle speed. In the algorithm presented in FIG. 32, the set speed is gradually reduced according to equation (7) until V_set equals V_set_new in a manner similar to that described in regard to the algorithm of FIG. 27.

In the algorithm presented in FIG. 32, if the system determines that the vehicle is not approaching a traffic light that has been red, the system will determine the distance Lf from the point where V_req changes for the low speed zone. Once Lf is determined, the system will then determine a value for the deceleration rate $\Delta$d_Vset, based on a predetermined relationship, as depicted in FIG. 29, for example, for the relationship between $\alpha$d_Vset and Lf.

After determining $\alpha$d_Vset from the predetermined relationship (this predetermined relationship may be stored in a look up table and/or communicated to the vehicle by an infrastructure communication device, etc.) a value for the time to decelerate $\Delta$t may be obtained, which is indicative of a value obtained by utilizing equation (8), where $\alpha$_Vset=ad_Vset. When T=$\Delta$t, the set speed is changed according to equation (7) until V_set equals V_set_new in a manner similar to that described in regard to the algorithm of FIG. 28. The set speed is decreasing changed until V_set=V_set_new.

In the event that V_set is less than V_set_new (i.e., the vehicle is to accelerate to reach the new set speed), a distance Lr from the caution zone to the location where V_req changes to a higher speed zone (V_req2 to V_req3) is determined. For a determined value of Lr, a value for $\alpha$a_Vset, may be determined utilizing, for example, the data presented in FIG. 29 for $\alpha$a_Vset, ($\alpha$_Vset, to accelerate). The algorithm proceeds in a manner similar to the deceleration regime except that the determined deceleration rate is now an acceleration rate.

It is noted that some of the embodiments of the present invention may not include an algorithm portion that determines the type or condition of a caution zone (e.g., may not determine whether a traffic light is red). That is, if it is determined that V_set is greater than V_set_new, the system may then proceed to determine the distance Lf regardless of the type of caution zone towards which the vehicle is heading.

Figure 33:
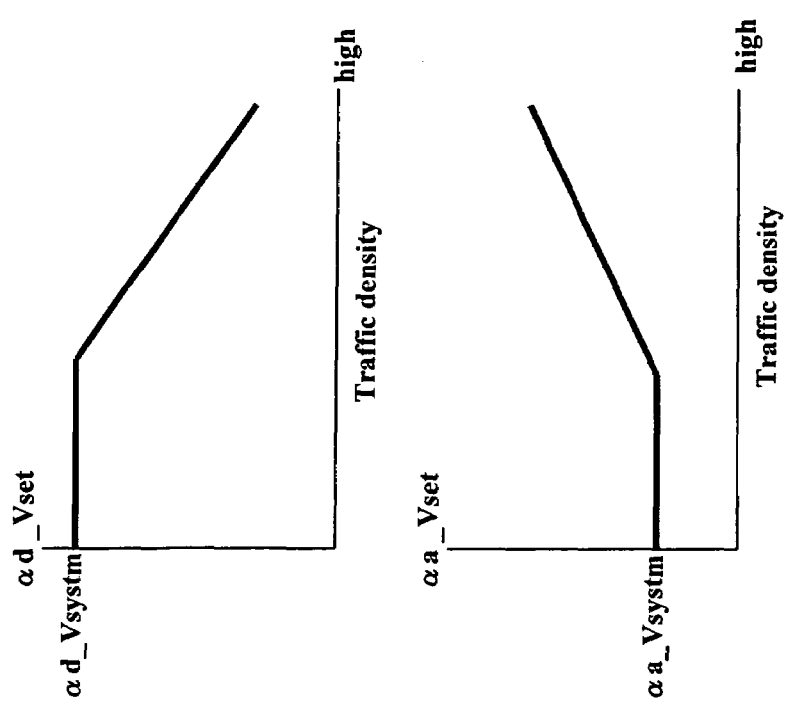
FIG. 33 presents a change in $\alpha\_Vset$ as related to traffic density according to an embodiment of the present invention.

Another embodiment of the present invention relates to the determination of the acceleration rate value, $\alpha$_Vset, used to change the vehicle speed to the new set speed based on traffic density. That is, $\alpha$d_Vset, and $\alpha$a_Vset, may be determined in response to variations in traffic density. On roads with high traffic density, values of $\alpha$d_Vset might be smaller than the value of $\alpha$d_Vsystm to reduce the opportunity that a vehicle behind approaches closer than usual and/or in order to reduce congestion caused by "shockwaves" (as described by way of example above) created by vehicles rapidly decelerating. The variable $\alpha$a_Vset, might be smaller than $\alpha$a_Vsystm in high density traffic in order to reduce the deterioration of traffic flow. On roads with low traffic density, $\alpha$d_Vset, and/or $\alpha$a_Vset, might be equalized to $\alpha$_Vsystm and $\alpha$_Vsystm respectively. Values for $\alpha$d_Vset, and/or $\alpha$a_Vset, may change in response to varying traffic density, as may be seen on the exemplary graphs of FIG. 33. The values of $\alpha$d_Vset and/or $\alpha$a_Vset might be determined through empirical testing and/or through computational modeling, or any other appropriate means. Of course, in other embodiments of the present invention, $\alpha$d_Vset and/or $\alpha$a_Vset may vary in a manner different than that shown in FIG. 33. For example, instead of a linearly changing $\alpha$d_Vset and/or $\alpha$a_Vset, an exponentially changing $\alpha$d_Vset and/or $\alpha$a_Vset might be utilized as related to traffic density. Such different regimes may be appropriate for different roadways.

Figure 34:
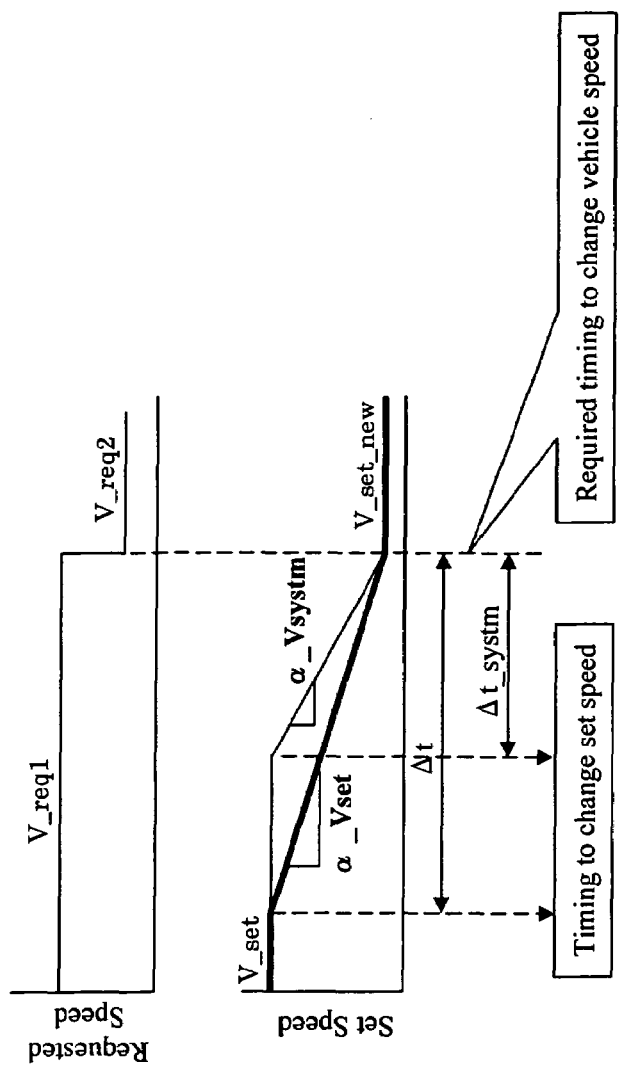
FIG. 34 presents a graphical representation of how host vehicle speed may vary based on a traffic density according to an embodiment of the present invention.

The values of $\Delta$d_Vset and/or $\alpha$a_Vset may be stored in a lookup table onboard the vehicles. Values for traffic density to determine $\alpha$a_Vset and/or $\alpha$d_Vset may be communicated to the vehicle via an infrastructure communication device and/or may be communicated by other vehicles to the host vehicle. Still further, in other embodiments, the vehicle itself may have the ability to estimate traffic density utilizing sensors on the vehicle. Thus, any appropriate method, system or apparatus that may be used to determine traffic density may be used to practice the present invention. FIG. 34 presents a schematic representation of how $\alpha$d_Vset vary for increasing traffic densities. As previously discussed, $\alpha$d_Vsystm and $\alpha$a_Vsystm are fixed by the system's deceleration and the acceleration.

Figure 35:
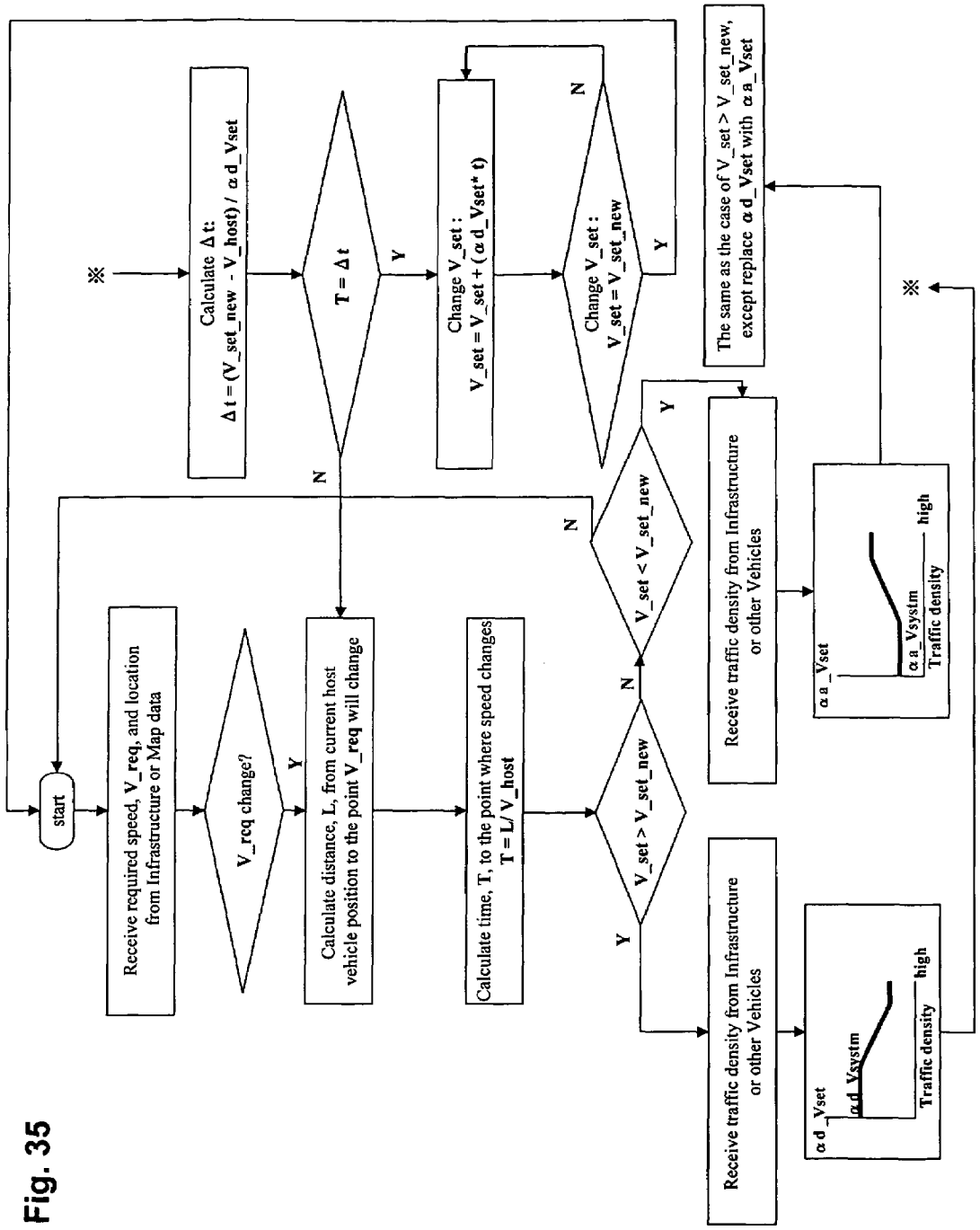
FIG. 35 presents an exemplary algorithm for changing set speed based on varying values of $\alpha\_Vset$ as related to traffic density.

FIG. 35 presents an exemplary algorithm for implementing an embodiment of the present invention where traffic density is utilized to determine $\alpha$_Vset. It will be noted that many of the sections of the algorithm are similar to those presented in FIG. 32, and thus further explanation will not be provided. As may be seen, if V_set is greater than V_set_new, a value for $\alpha$d_Vset will be obtained based on traffic density utilizing the chart for $\alpha$d_Vset, as shown. In the event that V_set is less than V_set_new, $\alpha$a_Vset for acceleration will be obtained based on a traffic density utilizing the chart for $\alpha$a_Vset. In this algorithm, the system may receive information relating to traffic density from infrastructure and/or other vehicles. Utilizing the value for $\alpha$d_Vset or $\alpha$a_Vset as $\alpha$_Vset, a time to decelerate or accelerate, respectively, will be determined, and, using the value $\alpha$d_Vset or $\alpha$a_Vset, V_set will be changed to change the set vehicle speed to the new set vehicle speed.

Figure 36:
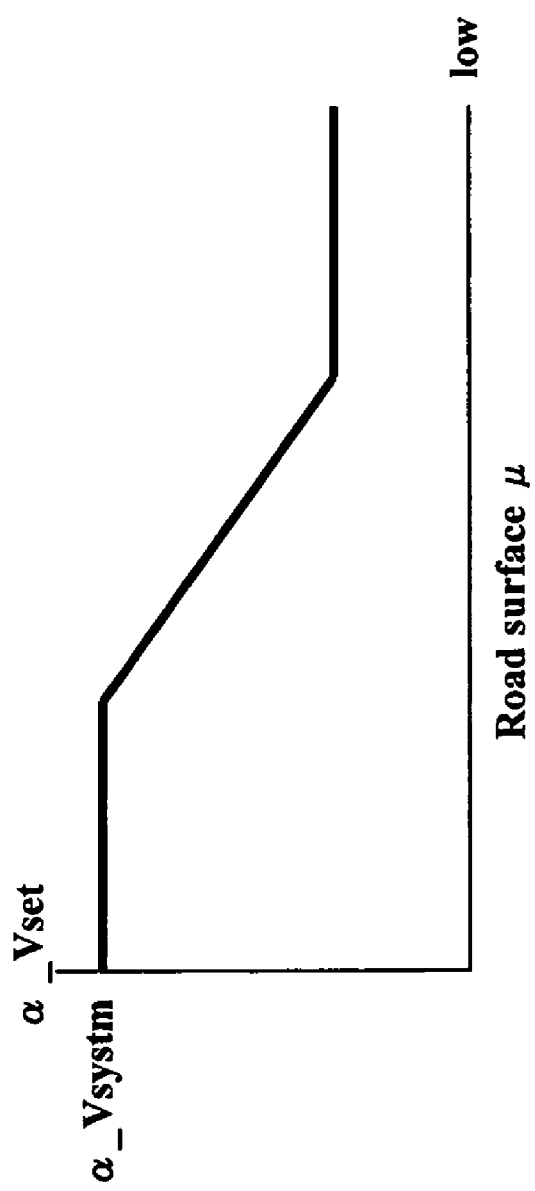
FIG. 36 presents a change in $\alpha\_Vset$ as related to road surface coefficient of friction according to an embodiment of the present invention.

Another embodiment of the present invention relates to varying the acceleration rate value to decelerate and/or accelerate a vehicle based on the surface condition of a roadway. For example, in the case of bad weather, such as rain and/or snow, that may create a situation where the road surface is more slippery than a dry surface, $\alpha$_Vset might be smaller than standard α_Vsystm in order to further increase vehicle control. In such an embodiment, α_Vset might be changed in response to road surface conditions, such as the coefficient of friction of a road surface μ, as noted above. FIG. 36 presents an exemplary graph of how α_Vset might change for varying road surface coefficients of friction. The road surface coefficient of friction could be determined as noted above.

The regime presented in FIG. 36 depicting a variation in α_Vset with decreasing road surface coefficient of friction may be developed through empirical and/or computational testing. As with the other regimes for α_Vset, other embodiments of the present invention may utilize a regime where α_Vset varies in a manner differently than that depicted in FIG. 36.

Figure 37:
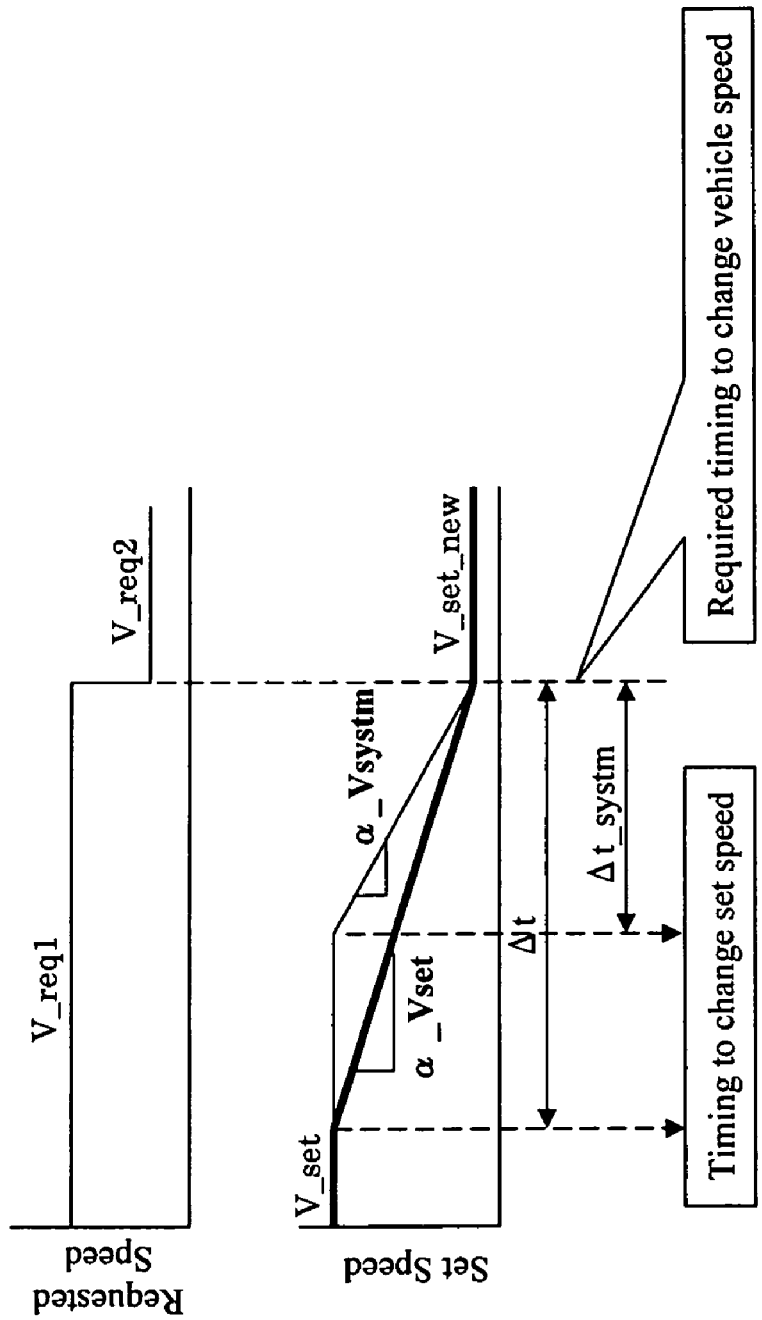
FIG. 37 presents a graphical representation of how host vehicle speed varies based on road surface conditions according to an embodiment of the present invention.

FIG. 37 presents a schematic that utilizes two different values of α_Vset for two different road surface conditions, where α_Vsystm is again fixed by system deceleration or acceleration. In the case of ACC, α_Vsystm is the same as coasting deceleration without a target vehicle.

Figure 38:
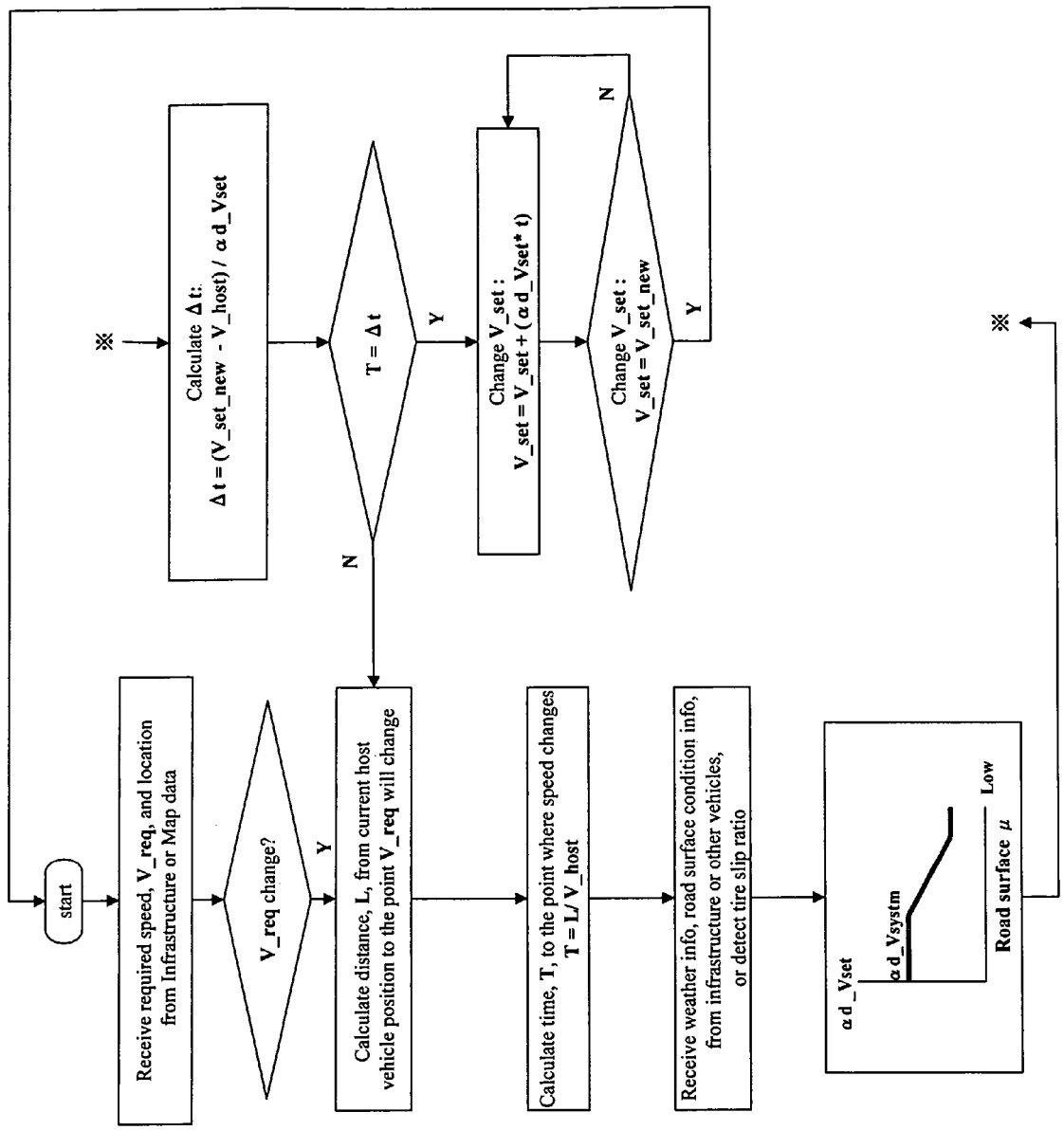
FIG. 38 presents an exemplary algorithm for changing set speed based on varying values of $\alpha\_Vset$ as related to road surface conditions.

FIG. 38 presents an exemplary algorithm for implementing this embodiment of the invention.

Figure 39:
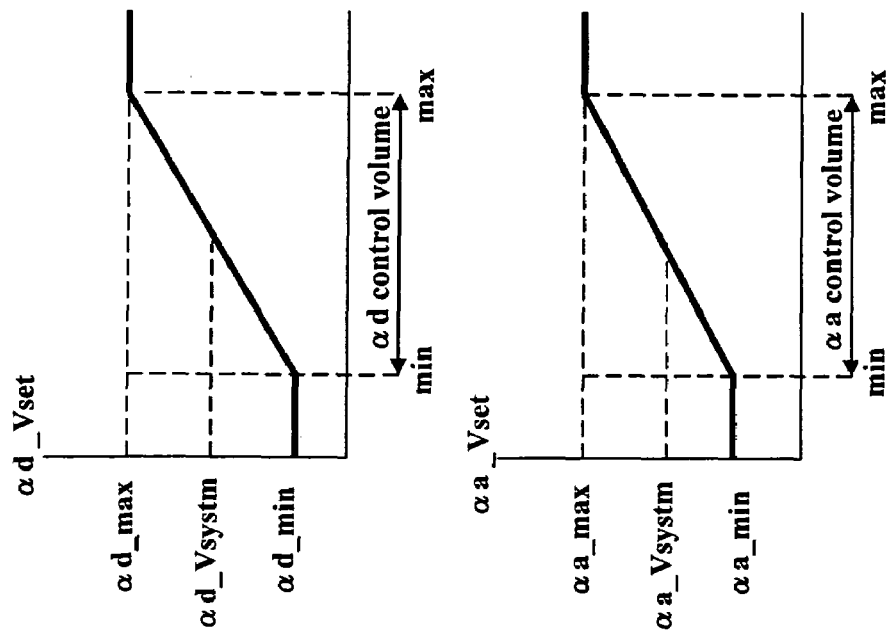
FIG. 39 presents a change in $\alpha\_Vset$ as related to a driver's desired deceleration/acceleration rates according to an embodiment of the present invention.

As noted above, an embodiment of the present invention includes a vehicle with a cooperative speed control system that may be equipped with a device that enables a driver to input a desired deceleration rate and/or a desired acceleration rate into the system. In a variant of that embodiment, by increasing the "volume" of the driver's input through the rheostat, the vehicle rate of acceleration, α_Vsystm, used to accelerate and decelerate would be reduced. FIG. 39 shows an exemplary regime for varying αd_Vset to change the vehicle speed from a set speed to a new set speed based on the variation in acceleration control volume. As may be seen from the regimes presented on FIG. 39, the nominal value for the range of αd_Vset and αa_Vset is centered around Δα_Vsystm and Δα_Vsystm, respectively, where αd_Vsystm and αa_Vsystm are fixed by system deceleration or acceleration. In the case of ACC, αd_Vsystm and αa_Vsystm is the same as coasting deceleration without a target vehicle. However, other regimes may be appropriate.

Figure 40:
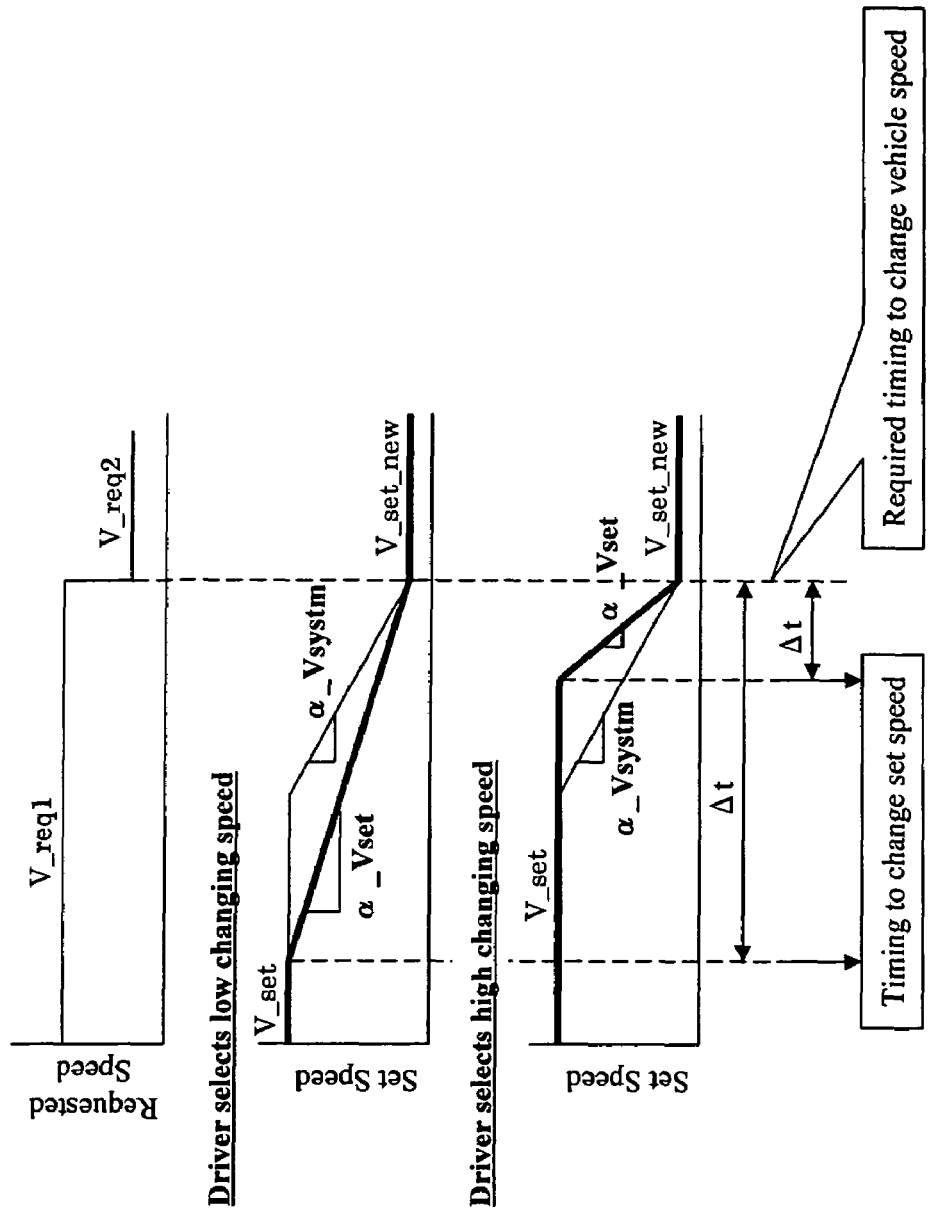
FIG. 40 presents a graphical representation of how host vehicle speed varies based on changing driver's desired deceleration/acceleration rates according to an embodiment of the present invention.
Figure 41:
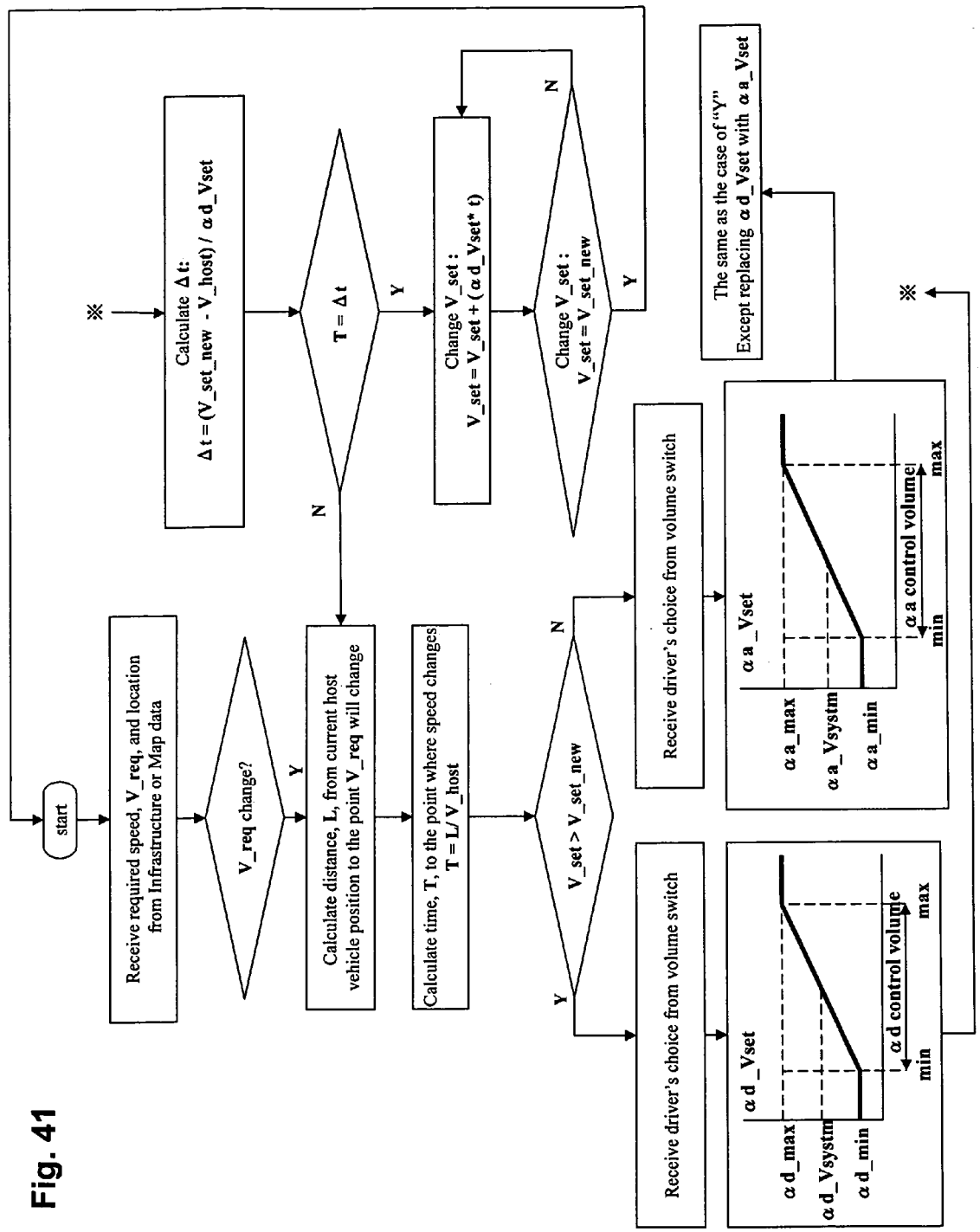
FIG. 41 presents an exemplary algorithm for changing set speed based on varying values of driver desired deceleration/acceleration rates.

FIG. 40 presents a graphical illustration that shows the difference between deceleration rates for a driver selected low acceleration rate and a driver selected high acceleration rate. FIG. 41 presents an exemplary algorithm for implementing this embodiment of the invention.

Some embodiments of the present invention include a processor that includes logic to determine a vehicle acceleration rate value that is adapted to receive at least a first signal indicative of a first local required speed, a second signal indicative of a second local required speed received after the first signal, and a third signal indicative of a value of a current vehicle speed, and information that will enable the processor to determine the vehicle acceleration rate value; wherein the processor includes logic to automatically determine a new set vehicle speed based at least on the first local required speed, the second local required speed, and the current vehicle speed, and automatically initiate output of a signal to a vehicle speed controller to change vehicle speed to a new set vehicle speed. In some embodiments, the logic allows for a determination of a new set vehicle speed by automatically identifying a vehicle acceleration rate value based on a current vehicle component status. In other embodiments, the processor further includes logic to automatically determine a value for a distance L, automatically determine a value for a time T, and automatically determine a value for the vehicle acceleration rate value. The processor may further include logic to initiate output of a signal to the vehicle speed controller to change the vehicle speed to the new set vehicle speed if the value of the times T and Δt are substantially equal to each other.

A processor according to embodiments of the present invention may also automatically determine a value for α_Vset based on predetermined values of α_Vset, etc. Thus, the invention includes a processor that is adapted to and/or includes logic to implement some or all of the various embodiments of the present invention.

It will be seen that various algorithms have been presented herein to implement various embodiments of the invention. In these algorithms, steps are listed serially only for convenience, except where necessary. That is, many steps presented in the algorithms as being performed after other steps may be performed parallel to or before these other steps presented in the algorithms. Still further, the algorithms have been presented in yes no format such that a "no" would break the algorithm/reset the algorithm. However, owing to advances in processing power, embodiments of the present invention may be utilized where portions of the algorithm and/or where the entire algorithm is/are run through regardless of results of portions of the algorithm. That is, by way of example, even in the case where the system has determined that the vehicle is headed towards a caution zone with a red traffic light, Lf may be still be calculated or otherwise determined, even though it may not be used to automatically determine the time to decelerate the vehicle and/or utilized to vary the set vehicle speeds. Thus, the algorithms present only one example of many possible algorithms to practice the present invention. Still further, it is noted that the flow charts presented herein are high level flow charts in that key information sufficient to write computer codes is provided.

The present invention includes methods of practicing the invention, software to practice the invention, and apparatuses configured to implement the present invention. Accordingly, the present invention includes a program product and hardware and firmware for implementing algorithms to practice the present invention, as well as the systems and methods described herein, and also for the control of the devices and implementation of the methods described herein.

It is noted that the term "vehicle" as used herein encompasses cars, trucks, SUVs, minivans, and all other types of land vehicles.

It is noted that the term "processor," as used herein, encompasses both simple circuits and complex circuits, as well as computer processors.

It is further noted that embodiments of the present invention extend to methods and infrastructure devices/systems for implementing the cooperative speed control system. By way of example, embodiments of the present invention include a roadway where a first infrastructure communication device is positioned proximate to the roadway and a second infrastructure communication device is positioned proximate to the roadway at a position "down the road" from the first device, where the devices broadcast a signal receivable by a vehicle with a cooperative speed control system according to the present invention.

Given the disclosure of the present invention, one versed in the art would appreciate that there are other embodiments and modifications within the scope and spirit of the present invention. Accordingly, all modifications attainable by one versed in the art from the present disclosure within the scope and spirit of the present invention are to be included as further embodiments of the present invention.

What is claimed is:

1. A device adapted to automatically control vehicle speed, comprising:
   a processor adapted to receive at least a first signal indicative of a first local required speed, a second signal indicative of a second local required speed received after the first signal, and a third signal indicative of a value of a current set vehicle speed; wherein the processor includes logic to:
   automatically determine a new set vehicle speed based at least on the first local required speed, the second local required speed, and the current set vehicle speed; and
   automatically initiate output of a signal to a vehicle speed controller to change vehicle speed to the new set vehicle speed.

2. The device according to claim 1, further comprising a speed control system adapted to receive input from a driver indicative of a desired vehicle speed, wherein the value of the current set vehicle speed is based on the desired vehicle speed.

3. The device according to claim 1, wherein the current set vehicle speed is a speed set by a driver.

4. The device according to claim 1, further comprising a speed control system, wherein the value of the current set vehicle speed is based on output of the speed control system, and wherein the speed control system is at least one of an ACC or a cruise control system.

5. The device according to claim 1, wherein the logic to automatically determine the new set vehicle speed includes logic to:
   determine a differentiation in speed between the second local required speed and the first local required speed; and
   determine the new set vehicle speed based on an adjustment to the value indicative of the current set vehicle speed by the determined differentiation.

6. The device according to claim 5, wherein the differentiation in speed is a value equivalent to a value determined by subtracting the first local required speed from the second local required speed, and wherein the new set vehicle speed determined by the logic is a value equivalent to a value determined by adding the differentiation in speed to the current set vehicle speed.

7. The device according to claim 5, wherein the differentiation in speed is a value equivalent to a value determined by dividing the second local required speed by the first local required speed, and wherein the new set vehicle speed determined by the logic is a value equivalent to a value determined by multiplying the differentiation in speed by the current set vehicle speed.

8. The device according to claim 1, wherein the processor includes logic to:
   determine a value indicative of a differentiation in speed between the current set vehicle speed and the first local required speed, wherein the value indicative of a differentiation in speed between the current set vehicle speed and the first local required speed is a value equivalent to a value determined by dividing the current set vehicle speed by the first local required speed; wherein
   the new set vehicle speed determined by the logic is a value equivalent to a value determined by multiplying the value indicative of a differentiation in speed by the second local required speed.

9. The device according to claim 8, further comprising a memory adapted to record the value indicative of a differentiation in speed;
   wherein the processor includes logic such that after the processor receives the second signal, the processor reads the value indicative of a differentiation in speed from the memory and multiplies the value read from the memory by the second local required speed.

10. A device adapted to automatically control vehicle speed, comprising:
    a processor adapted to receive information indicative of average speed of other vehicles around a vehicle, wherein the processor includes logic to:
    automatically determine a new set vehicle speed based at least on the average speed of the other vehicles; and
    automatically initiate output of a signal to a vehicle speed controller to change vehicle speed to the new set vehicle speed.

11. The device according to claim 10, wherein the processor includes logic to only initiate output of the signal to the vehicle speed controller to change the vehicle speed to the new set vehicle speed if the new set vehicle speed is (i) lower than or (ii) lower than or the same as a current speed of the vehicle.

12. A device adapted to automatically control vehicle speed, comprising:
    a processor adapted to receive at least first information indicative of a first average speed of vehicles proximate to a vehicle, second information indicative of a second average speed of vehicles proximate to the vehicle received after the first information, and third information indicative of a value of a current set vehicle speed; wherein the processor includes logic to:
    automatically determine a new set vehicle speed based at least on the first average speed, the second average speed, and the current set vehicle speed; and
    automatically initiate output of a signal to a vehicle speed controller to change vehicle speed to the new set vehicle speed.

13. A vehicle comprising:
    the device according to claim 12.

14. A vehicle comprising:
    the device according to claim 1.

15. The device according to claim 12, further comprising a speed control system, wherein the value of the current set vehicle speed is based on output of the speed control system, and wherein the speed control system is at least one of an ACC or a cruise control system.

16. The device according to claim 12, wherein the logic to automatically determine the new set vehicle speed includes logic to:
    determine a differentiation in speed between the second average speed of vehicles proximate to the vehicle and the first average speed of vehicles proximate to the vehicle; and
    determine the new set vehicle speed based on an adjustment to the value of the current set vehicle speed by the determined differentiation.

17. The device according to claim 16, wherein the differentiation in speed is a value equivalent to a value determined by subtracting the first average speed of vehicles proximate to the vehicle from the second average speed of vehicles proximate to the vehicle, and wherein the new set vehicle speed determined by the logic is a value equivalent to a value determined by adding the differentiation in speed to the current set vehicle speed.

18. The device according to claim 16, wherein the differentiation in speed is a value equivalent to a value determined by dividing the second average speed of vehicles proximate to the vehicle by the first average speed of vehicles proximate to the vehicle, and wherein the new set vehicle speed determined by the logic is a value equivalent to a value determined by multiplying the differentiation in speed by the current set vehicle speed.

19. The device according to claim 12, wherein the processor includes logic to:
   determine a value indicative of a differentiation in speed between the current set vehicle speed and the first average speed of vehicles proximate to the vehicle, wherein the value indicative of a differentiation in speed between the current set vehicle speed and the first average speed of vehicles proximate to the vehicle is a value equivalent to a value determined by dividing the current set vehicle speed by the first average speed; wherein
   the new set vehicle speed determined by the logic is a value equivalent to a value determined by multiplying the value indicative of a differentiation in speed by the second average speed of vehicles proximate to the vehicle.

20. The device according to claim 19, further comprising a memory adapted to record the value indicative of a differentiation in speed, wherein the processor includes logic to:
   read the value indicative of a differentiation in speed from the memory after the processor receives the second information, and multiply the value read from the memory by the second average speed of vehicles proximate to the vehicle to determine the new set vehicle speed.

21. A device adapted to automatically control vehicle speed, comprising:
   a processor adapted to receive a plurality of first signals indicative of respective set vehicle speeds and a plurality of second signals indicative of respective required speeds; and
   a memory adapted to record the respective set vehicle speeds and the required speeds from at least some of the signals received by the processor such that at least some of the respective set vehicle speeds are linked to respective required speeds;
   wherein the processor includes logic to:
      automatically determine that a signal received by the processor is indicative of a current required speed and initiate output of a signal to a vehicle speed controller to set a vehicle speed based on the respective set speed linked to the respective required speed stored in the memory if the respective required speed stored in the memory is substantially the same as the current required speed.

22. A device adapted to automatically control vehicle speed, comprising:
   a processor adapted to:
      receive a plurality of first signals indicative of respective set vehicle speeds and a plurality of second signals indicative of respective required speeds; and
      obtain respective values indicative of respective ratios of the set vehicle speeds and the respective required speeds from at least some of the signals received by the processor; and
   a memory adapted to record the respective values of at least some of the ratios obtained by the processor such that at least some of the ratios are linked to respective required speeds;
   wherein the processor includes logic to:
      automatically determine that a signal received by the processor is indicative of a current required speed and initiate output of a signal to a vehicle speed controller to set a vehicle speed based on the respective ratio linked to the respective required speed stored in the memory if the respective required speed stored in the memory is substantially the same as the current required speed.

23. The device according to claim 22, wherein the set vehicle speed is based on a value that is equivalent to a value obtained by multiplication of the respective linked ratio by the current required speed.

24. A device adapted to automatically control vehicle speed, comprising:
   a processor adapted to receive a plurality of first signals indicative of respective set vehicle speeds and a plurality of second signals indicative of respective required speeds and adapted to obtain a plurality of values indicative of respective differentiations between at least some of the respective set vehicle speeds and respective required speeds from at least some of the signals received by the processor; and
   a memory adapted to record at least some of the plurality of values indicative of respective differentiations between respective set vehicle speeds and respective required speeds such that at least some of the differentiations are linked to respective required speeds;
   wherein the processor includes logic to:
      automatically determine that a signal received by the processor is indicative of a current required speed and initiate output of a signal to a vehicle speed controller to set a vehicle speed based on the respective differentiation linked to the required speed stored in the memory if the respective required speed stored in the memory is substantially the same as the current required speed.

25. A method for automatically controlling vehicle speed, comprising:
   automatically determining a first local required speed;
   automatically determining a second local required speed;
   automatically determining a current set vehicle speed;
   automatically determining a new set vehicle speed based at least on the first local required speed, the second local required speed, and the current set vehicle speed; and
   automatically changing vehicle speed to the new set vehicle speed.

26. The method according to claim 25, further comprising activating a speed control system to set the current set vehicle speed.

27. The method according to claim 25, further comprising
   automatically determining a differentiation in speed between the second local required speed and the first local required speed; and
   automatically determining the new set vehicle speed based on an adjustment to the current set vehicle speed by the determined differentiation.

28. The method according to claim 27, wherein automatically determining the differentiation in speed is accomplished by determining a value equivalent to a value determined by subtracting the first local required speed from the second local required speed, and wherein automatically determining the new set vehicle speed is accomplished by determining a value equivalent to a value determined by adding the differentiation in speed to the current set vehicle speed.

29. The method according to claim 27, wherein automatically determining the differentiation in speed is accomplished by determining a value equivalent to a value determined by dividing the second local required speed by the first local required speed, and wherein automatically determining the new set vehicle speed is accomplished by determining a value equivalent to a value determined by multiplying the differentiation in speed by the current set vehicle speed.

30. A method for automatically controlling vehicle speed in a vehicle, comprising:

automatically determining an average speed of other vehicles around the vehicle, automatically determining a new set vehicle speed based at least on the average speed of other vehicles around the vehicle; and automatically changing vehicle speed to the new set vehicle speed.

31. A method for automatically controlling vehicle speed in a vehicle, comprising:

automatically determining a first average speed of vehicles proximate to the vehicle;

automatically determining a second average speed of vehicles proximate to the vehicle after determining the first average speed;

automatically determining a current set vehicle speed;

automatically determining a new set vehicle speed based at least on the first average speed, the second average speed, and the current set vehicle speed; and automatically changing vehicle speed to the new set vehicle speed.

32. The method according to claim 31, wherein automatically determining the new set vehicle speed includes:

automatically determining a differentiation in speed between the second average speed of vehicles proximate to the vehicle and the first average speed of vehicles proximate to the vehicle; and automatically determining the new set vehicle speed based on an adjustment to the current set vehicle speed by the determined differentiation.

33. A method for automatically controlling vehicle speed, comprising:

automatically determining a plurality of respective set vehicle speeds and a plurality of respective required speeds;

automatically recording in a memory at least some of the respective set vehicle speeds and the respective required speeds such that at least some of the respective set vehicle speeds are linked to respective required speeds;

automatically determining that a current required speed is a speed indicative of a required speed recorded in the memory; and automatically changing vehicle speed to the respective set vehicle speed linked to the respective required speed stored in the memory if the respective required speed stored in the memory is substantially the same as the current required speed.

34. A method for automatically controlling vehicle speed, comprising:

automatically determining a plurality of respective set vehicle speeds and a plurality of respective required speeds;

automatically determining a plurality of values indicative of respective differentiations between respective set vehicle speeds and respective required speeds and storing the differentiations in a memory such that at least some of the differentiations are linked to respective required speeds;

automatically determining that a current required speed is a speed indicative of a respective required speed stored in the memory; and automatically changing vehicle speed based on the respective differentiation linked to the respective required speed stored in the memory if the respective required speed stored in the memory is substantially the same as the current required speed.

* * * * *